(12) United States Patent
Kamimura et al.

(10) Patent No.: US 7,063,794 B2
(45) Date of Patent: Jun. 20, 2006

(54) WATER TREATMENT APPARATUS

(75) Inventors: Miki Kamimura, Tokyo (JP); Seiji Furukawa, Tokyo (JP); Satoshi Ueyama, Tokyo (JP); Junji Hirotsuji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/826,361

(22) Filed: Apr. 19, 2004

(65) Prior Publication Data
US 2004/0226893 A1 Nov. 18, 2004

(30) Foreign Application Priority Data
May 13, 2003 (JP) .............................. 2003-134386

(51) Int. Cl.
C02F 1/32 (2006.01)
C02F 1/78 (2006.01)

(52) U.S. Cl. ...................... 210/748; 210/192; 210/209; 422/186.3; 250/436

(58) Field of Classification Search ................ 210/748, 210/760, 192, 198.1, 205, 209; 422/24, 28, 422/186.3, 186.07; 250/432 R, 435, 436
See application file for complete search history.

(56) References Cited

U.S. PATENT DOCUMENTS

| | | | | |
|---|---|---|---|---|
| 4,230,571 A | * | 10/1980 | Dadd | 210/760 |
| 4,428,757 A | * | 1/1984 | Hall | 96/175 |
| 4,640,782 A | * | 2/1987 | Burleson | 210/748 |
| 5,635,059 A | * | 6/1997 | Johnson | 210/192 |
| 5,709,799 A | * | 1/1998 | Engelhard | 210/748 |
| 6,280,615 B1 | * | 8/2001 | Phillips et al. | 210/198.1 |

FOREIGN PATENT DOCUMENTS

JP 5-192673 8/1993

OTHER PUBLICATIONS

Shen et al., "Decomposition of Gas-phas chloroethenes by UV/$O_3$ Process", *Water Research*, (1998), pp. 2669-2679, 32(9), Taiwan.

* cited by examiner

*Primary Examiner*—Frank M. Lawrence
(74) *Attorney, Agent, or Firm*—Leydig, Voit & Mayer, Ltd.

(57) ABSTRACT

A water treatment apparatus dissolving an oxidizer in wastewater at a fast speed and at a high efficiency to decompose substances at a high decomposition rate. The apparatus includes an ultraviolet radiation part having an elongated tubular configuration, and receiving an axially extending ultraviolet radiation unit with a space between an inner peripheral surface of the ultraviolet radiation unit and the ultraviolet radiation unit to pass wastewater; and an oxidizer mixing part disposed adjacent to and upstream of the ultraviolet radiation part for mixing an oxidizer with the wastewater. The ultraviolet radiation unit irradiates the wastewater with ultraviolet light to decompose the substances to be treated in the wastewater.

12 Claims, 20 Drawing Sheets

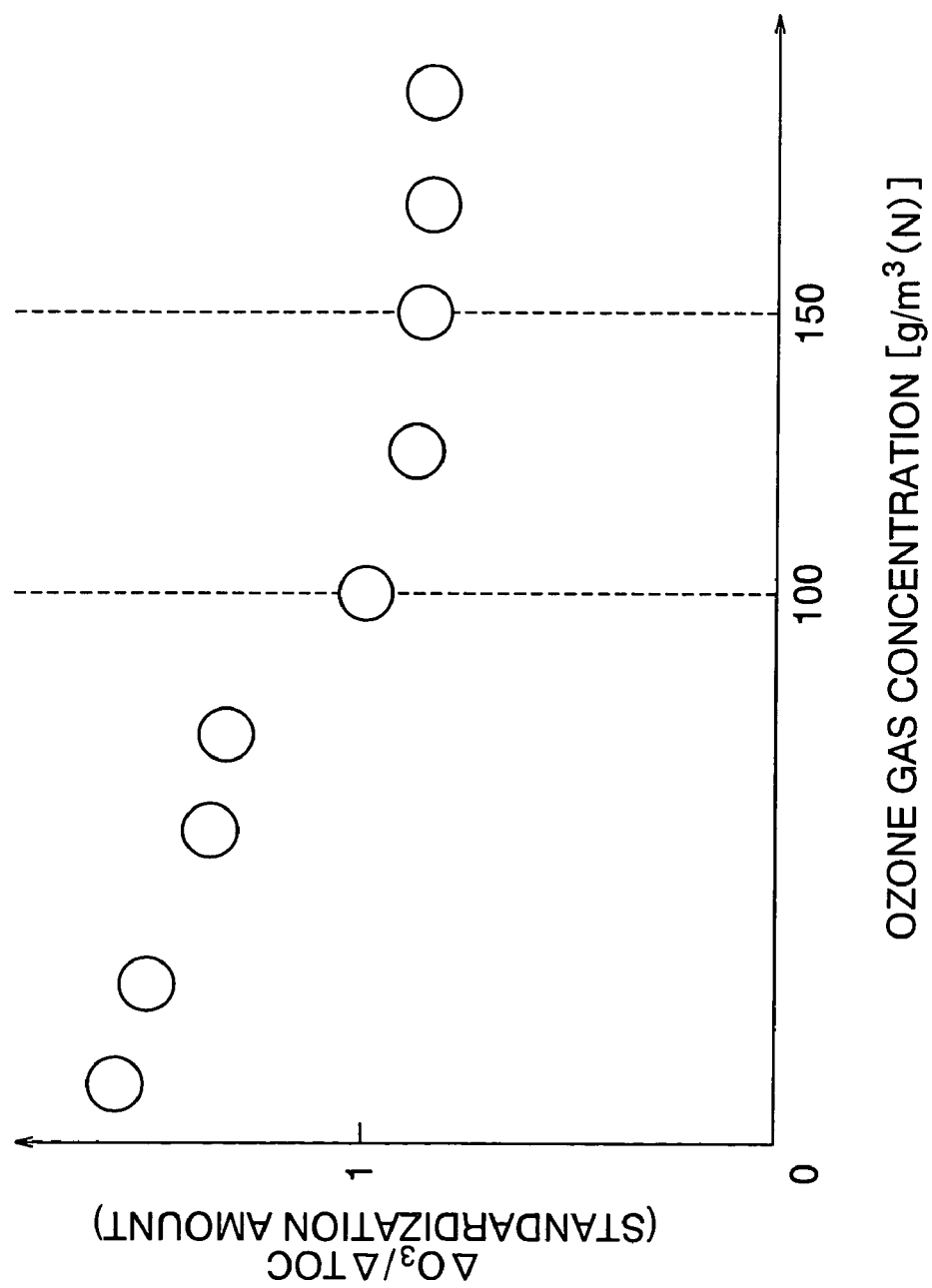

WATER TREATMENT APPARATUS

BACKGROUND OF THE INVENTION

1. Field of the Invention

The present invention relates to a water treatment apparatus designed to produce tap water and to treat wastewater or underground water and industrial wastewater, etc., and more particularly, it relates to a water treatment apparatus in which wastewater is highly purified using ultraviolet radiation together with an oxidizer such as, for example, ozone, etc.

2. Description of the Related Art

A water treatment apparatus using an oxidizer, such as ozone, and ultraviolet radiation in combination decomposes substances to be treated such as organochlorine compounds in wastewater using radical seeds, such as hydroxyl radicals, etc., which are produced by irradiating the oxidizer, such as ozone, with ultraviolet light.

As such a water treatment apparatus, it has hitherto been proposed to diffuse an ozone gas into wastewater that flows in a cylindrical reaction tank, and to further irradiate ultraviolet light from an ultraviolet lamp onto the water, whereby substances to be treated in the wastewater are decomposed, thus discharging the water thus treated as effluent.

In a known water treatment apparatus, it was general that an ultraviolet lamp was installed in the center of a water tank of a cylindrical, hexahedral, or other like configuration. In addition, as an oxidizer mixing means, there has generally been used a scheme in which a diffuser or the like is installed in a water tank into which wastewater is caused to flow, so that an ozone gas is dispersed as gas bubbles into the wastewater thereby to mix and dissolve ozone with and into the water (see, for example, a first patent document: Japanese patent application laid-open No. H5-192673).

With such a known water treatment apparatus, using the diffuser as an oxidizer mixing means, however, there was a limit to the control of the diameters or sizes of gas bubbles, thus making it difficult to increase gas-liquid interfacial area to any satisfactory extent. Therefore, the dissolution rate of ozone was slow, and there was a problem that the substances to be treated were not decomposed at a high efficiency in a short period of time.

Furthermore, since the known water treatment apparatus has the ultraviolet lamp installed in the center of the water tank of the cylindrical, hexahedral, or other like configuration, there was another problem that the strength of ultraviolet light required for the treatment of the wastewater was not obtained in an area apart from the ultraviolet lamp, resulting in a low decomposition rate of the substances to be treated.

SUMMARY OF THE INVENTION

Accordingly, the present invention is intended to solve the problems as referred to above, and has for its object to provide a water treatment apparatus which is capable of dissolving an oxidizer into wastewater at a fast speed and at a high efficiency thereby to decompose substances to be treated at a high decomposition rate.

With the above object in view, according to the present invention, there is provided a water treatment apparatus including: an ultraviolet radiation part that is formed into an elongated tubular configuration, and receives therein an axially extending ultraviolet radiation unit with a space formed between an inner peripheral surface thereof and the ultraviolet radiation unit to pass therethrough wastewater; and an oxidizer mixing part that is disposed adjacent to and upstream of the ultraviolet radiation part. The oxidizer mixing part includes: a minimum sectional area part that is formed with an oxidizer suction port for sucking an oxidizer supplied from an oxidizer supply part into wastewater, and is squeezed to a prescribed sectional area; and a conical cone part of a tapered configuration that expands from the minimum sectional area part to a large passage part of the same thickness as that of the ultraviolet radiation part.

Therefore, the bubble diameter or size of the oxidizer can be decreased, and an increase in the bubble diameter or size due to the coalescence of gas bubbles is further suppressed. As a consequence, a gas-liquid interfacial area increases, whereby the dissolution of the oxidizer into a liquid phase can be facilitated, thus making it possible to decompose substances to be treated at a high decomposition rate.

BRIEF DESCRIPTION OF THE DRAWINGS

FIG. 20 is a characteristic view illustrating the effect of the water treatment apparatus according to the thirteenth embodiment.

DESCRIPTION OF THE PREFERRED EMBODIMENTS

Now, preferred embodiments of the present invention will be described below in detail while referring to the accompanying drawings.

Embodiment 1

Figure 1:
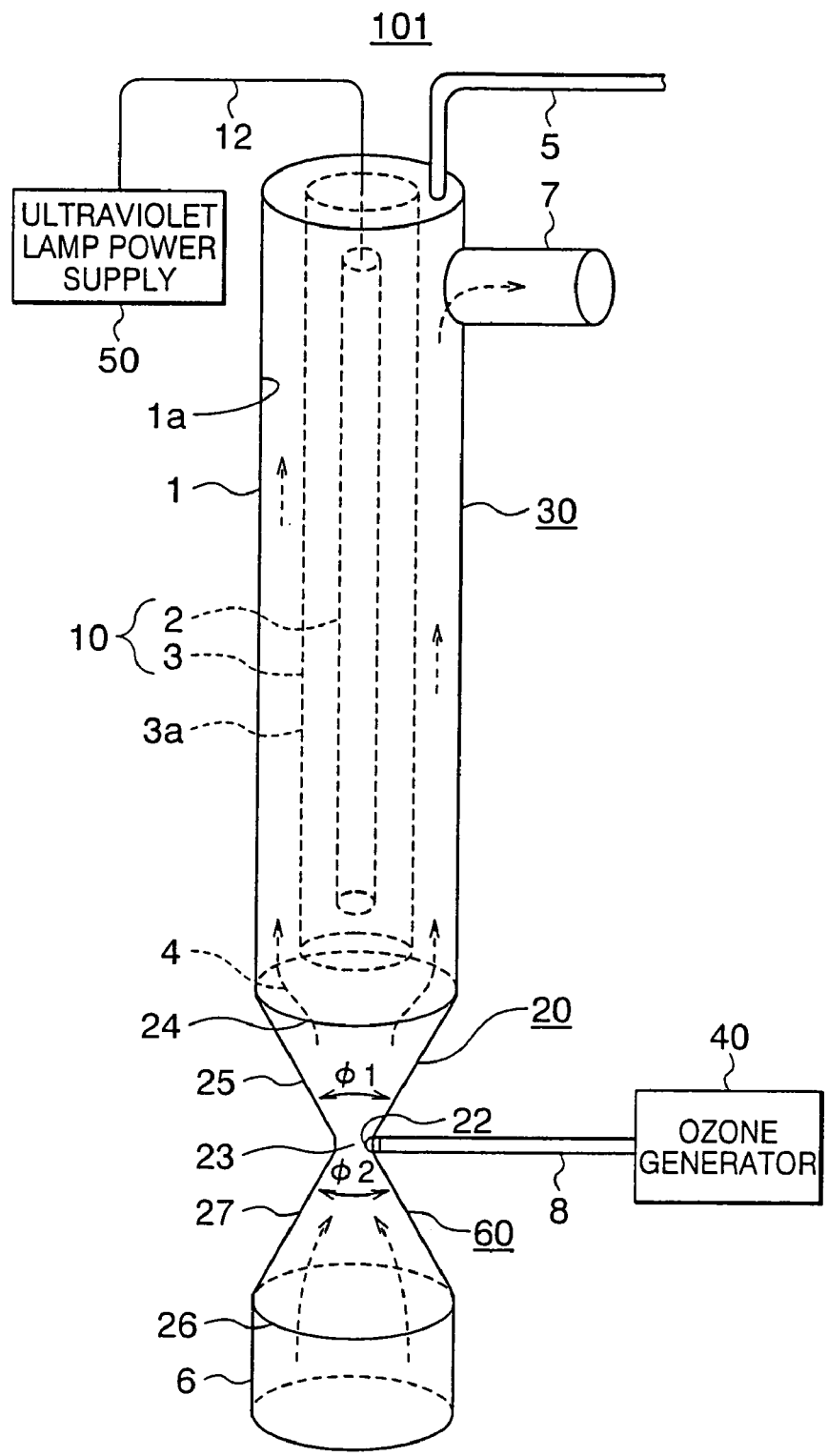
FIG. 1 is a schematic diagram illustrating the arrangement of a water treatment apparatus according to a first embodiment of the present invention.

FIG. 1 is a schematic diagram illustrating the arrangement of a water treatment apparatus according to a first embodiment of the present invention. In FIG. 1, the water treatment apparatus, generally designated at reference numeral 101, includes an ultraviolet radiation part 30 with an ultraviolet radiation unit 10 received therein for irradiating ultraviolet light onto the wastewater 4, which is caused to pass through the ultraviolet radiation part 30, thereby to decompose substances to be treated in the wastewater 4, and an oxidizer mixing part 60 arranged at a location adjacent the ultraviolet radiation part 30 for mixing an oxidizer with the wastewater 4.

The ultraviolet radiation unit 10 is arranged inside an elongated cylindrical piping type reactor 1 along the central axis thereof. The ultraviolet radiation unit 10 is comprised of a substantially bar-shaped ultraviolet lamp 2, and a lamp jacket 3 surrounding this ultraviolet lamp 2. The lamp jacket 3 is of a cylindrical configuration, and is arranged between the piping type reactor 1 and the ultraviolet lamp 2, and has a length extending to cover the entire length of the ultraviolet lamp 2. The lamp jacket 3 has an outer wall surface that serves to form an ultraviolet radiation surface 3a for irradiating ultraviolet light from the ultraviolet lamp 2 onto an inner wall or peripheral surface 1a of the piping type reactor 1. The piping type reactor 1, the ultraviolet lamp 2 and the lamp jacket 3 together constitute the ultraviolet radiation part 30. An ultraviolet lamp power supply 50 is electrically connected to the ultraviolet lamp 2 through an electric wire or conductor 12.

In addition, a wastewater inlet pipe 6, into which wastewater flows, is connected with an upstream side of the ultraviolet radiation part 30. On the other hand, a treated water outlet pipe 7 and an exhaust ozone gas discharge pipe 5, into which the water having been treated in the ultraviolet radiation part 30 flows out, are connected with a downstream side of the ultraviolet radiation part 30.

Further, a squeeze portion 20, which is formed by squeezing or tapering a part of a pipe, is arranged between the ultraviolet radiation part 30 and the wastewater inlet pipe 6. This squeeze portion 20 is formed with an oxidizer suction port 22 for sucking or drawing the oxidizer. The oxidizer suction port 22 is in communication with an ozone generator 40 through an ozone pipe 8. The squeeze portion 20, the oxidizer suction port 22, the ozone pipe 8 and the ozone generator 40 together constitute an oxidizer mixing part 60 for mixing the oxidizer with the wastewater.

The squeeze portion 20 has a minimum sectional area part that is squeezed or tapered up to a prescribed sectional area. The squeeze portion 20 includes a first conical part 25 of a conical or tapered configuration with its diameter gradually increasing from a small diameter portion (minimum sectional area part) 23 joined to the piping type reactor 1 to a large diameter portion (large passage part) 24, and a second conical part 27 of a conical or tapered configuration with its diameter gradually decreasing from a large diameter portion 26 jointed to the wastewater inlet pipe 6 to the small diameter portion (minimum sectional area part) 23. The above-mentioned oxidizer suction port 22 is formed in the small diameter portion (minimum sectional area part) 23 that has a minimum sectional area.

The first conical part 25 has a taper angle $\phi 1$ which can be selected from an angular range from 3 degrees to 175 degrees, inclusive, preferably from 5 degrees to 90 degrees, inclusive, and more preferably 10 degrees to 20 degrees, inclusive. In this embodiment, the taper angle $\phi 1$ of 15 degrees was used. On the other hand, the second conical part 27 has a taper angle $\phi 2$ which can be selected from an angular range from 3 degrees to 175 degrees, inclusive, and in this embodiment, the taper angle $\phi 2$ of 30 degrees was used. Here, note that the second conical part 27 is not necessarily required for the oxidizer mixing part 60 in this embodiment. That is, a prescribed or intended effect can be achieved if there are provided the small diameter portion (minimum sectional area part) 23, which is squeezed or tapered up to the prescribed sectional area, and the first conical part 25 of the tapered configuration, which extends from this small diameter portion (minimum sectional area part) 23 up to the large passage part 24 of the same thickness or diameter as that of the ultraviolet radiation part 30. Those passage portions such as the second conical part 27 and the wastewater inlet pipe 6 which are located upstream of the small diameter portion (minimum sectional area part) 23 may be formed of a straight pipe of a constant size having the same diameter as that of the small diameter portion (minimum sectional area part) 23.

Now, the operation of this embodiment will be described below. First of all, wastewater flows into the piping type reactor 1 through the wastewater inlet pipe 6. In the squeeze portion 20, an ozone gas generated by the ozone generator 40 is supplied to the incoming wastewater 4 through the ozone pipe 8 and the oxidizer suction port 22 so that it is sucked or drawn into the wastewater 4 thereby to generate a large amount of fine bubbles of the ozone gas. The ozone gas in the fine bubbles is turned into dissolved ozone as it moves into a liquid phase, so that highly oxidizing hydroxyl radicals are generated by the reaction of the dissolved ozone and the ultraviolet light irradiated from the ultraviolet lamp 2 that is lit by application thereto of a voltage from the ultraviolet lamp power supply 50 through the electric wire 12. The hydroxyl radicals oxidize and decompose the substances to be treated in the wastewater, and the water thus cleaned or purified is discharged from the treated water outlet pipe 7. Moreover, a part of ozone gas which has not been able to be dissolved in the wastewater, i.e., an exhaust ozone gas, is escaped to the outside of the system through the exhaust ozone gas discharge pipe 5.

Thus, since the apparatus shown in this embodiment is constructed such that an ozone gas is strongly sucked for mixing from the squeeze portion 20 of the piping type reactor 1, the diameters of ozone gas bubbles can be made smaller as compared with known apparatuses in which an ozone gas is caused to be absorbed into wastewater by the use of a diffuser, whereby an gas-liquid interfacial area is increased, thus making it possible to facilitate the dissolution of ozone into the liquid phase. That is, by facilitating the generation of hydroxyl radicals, there is obtained an advantageous effect of being able to decompose the substances to be treated at a high speed and at a high efficiency.

In addition, the squeeze portion 20 coupled with the piping type reactor 1 has the first conical part 25 shaped into a conical configuration with its diameter gradually increasing from the small diameter portion (minimum sectional area part) 23 to the large diameter portion (large passage part) 24 joined to the piping type reactor 1, as stated above, and hence the flow passage at the downstream side of the squeeze portion 20 is made to change smoothly without any abrupt variation in diameter such as sudden enlargement or expansion, so that an increase in diameter of gas bubbles due to the coalescence or combination thereof can be suppressed to continuously keep the diameters or sizes of gas bubbles in a small state. As a result, the gas-liquid interfacial area becomes large, thus making it possible to facilitate the ozone dissolution into the liquid phase. That is, facilitating the generation of hydroxyl radicals provides an advantageous effect of being able to decompose substances to be treated at a high speed and at a high efficiency.

Figure 2:
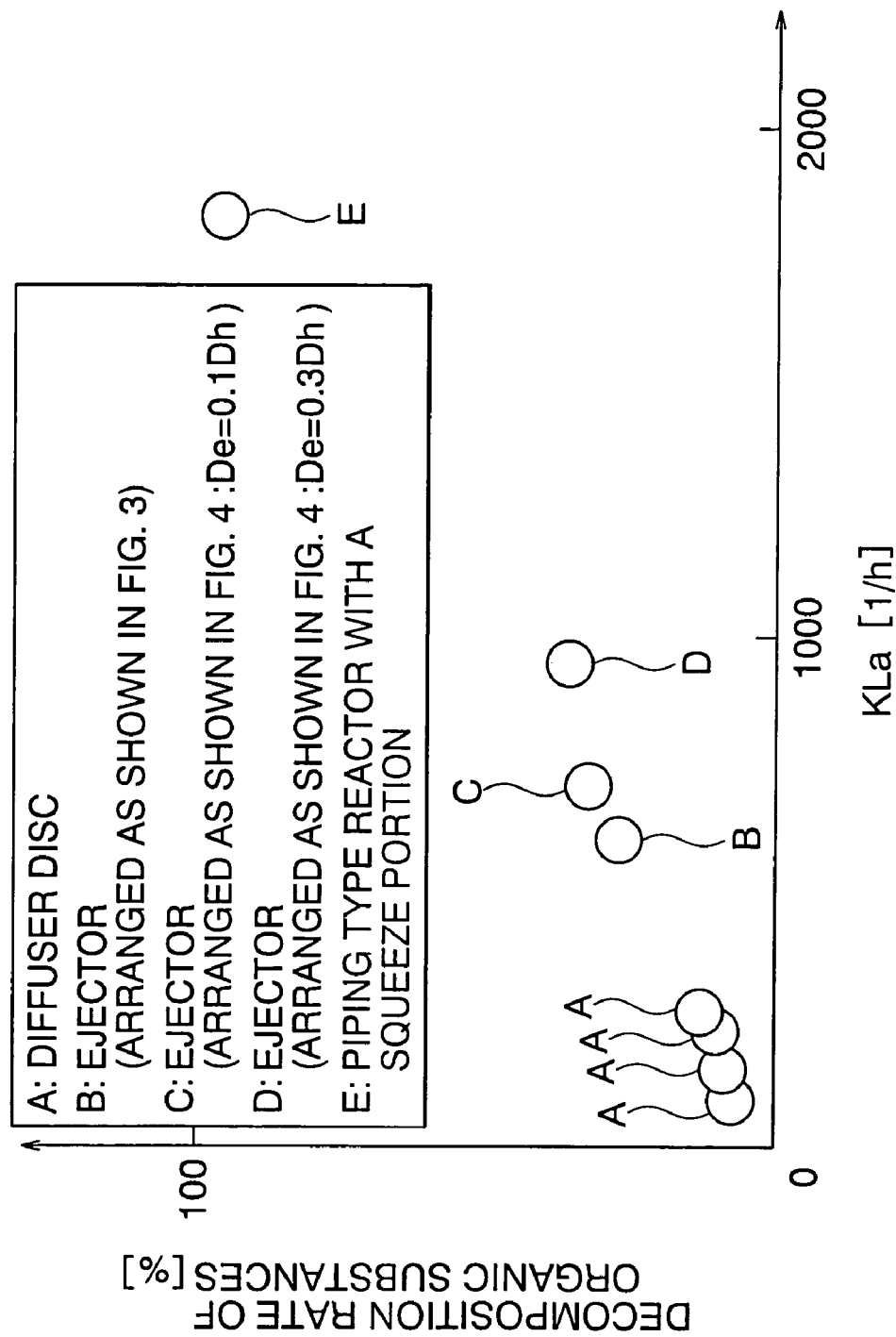
FIG. 2 is a characteristic view illustrating the effect of the water treatment apparatus according to the first embodiment.

FIG. 2 is a characteristic view illustrating the effect of the water treatment apparatus according to this embodiment. This shows the result of experiments in which there was obtained the relation between an overall mass transfer rate KLa in the piping type reactor and the decomposition rate of organic substances to be treated when water treatment was performed on the condition that the volume of the piping type reactor 1 is 5 L; the flow rate of wastewater is 3 L/min (the retention time of the wastewater: 1.67 minutes); the concentration of TOC (total organic carbon) in the wastewater is 10 mg/L; the flow rate of the ozone gas is 1.5 L/min; the concentration of the ozone gas is 200 g/m$^3$(N); and the output power of the ultraviolet lamp is 110 W. The overall mass transfer rate KLa is an index representing the dissolution rate of ozone, and is expressed by the product of a gas-liquid interfacial area per unit volume a and an overall mass transfer coefficient KL. That is, the greater the gas-liquid interfacial area a, the greater does the KLa become.

According to the inventors' experiments, it has been found that the decomposition rate of organic substances increases in accordance with the increasing KLa, i.e., the increasing gas-liquid interfacial area, as shown in plots of FIG. 2.

The experimental result of a water treatment apparatus in which a diffuser used for known water treatment apparatuses was installed in place of the oxidizer mixing part 60 of the water treatment apparatus of this embodiment is indicated by plots A in FIG. 2. Since typical diffuser discs for the diffuser have their KLa varying depending on their bore diameters, etc., several kinds of ones were tested, but even the greatest value of the KLa is about 200, and the decomposition of the organic substances has not proceeded so much in such a range (i.e., up to about 200 at maximum) of the KLa.

Figure 3:
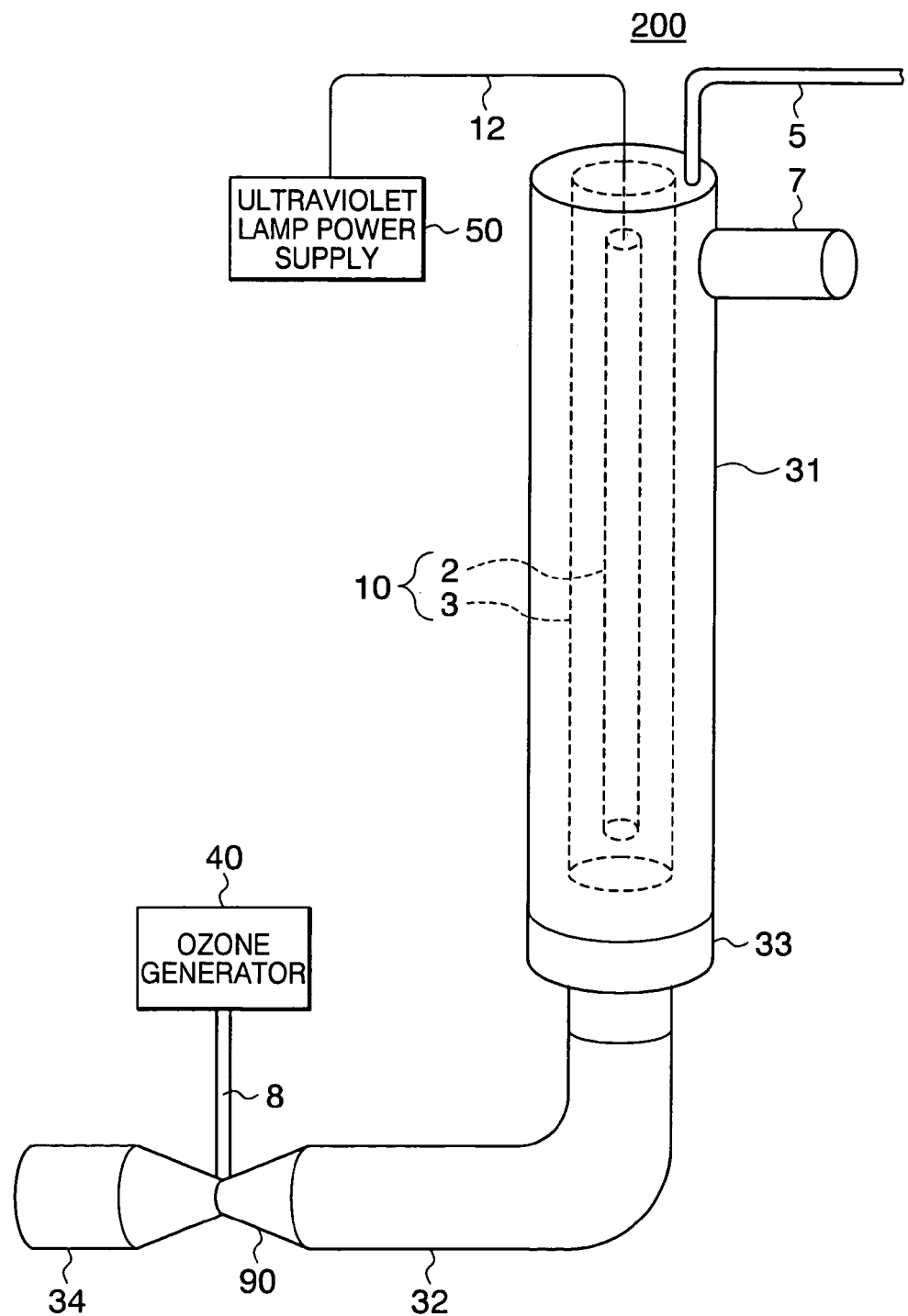
FIG. 3 is a schematic diagram illustrating the arrangement of a water treatment apparatus for comparison purpose in which an ejector is connected with a piping type reactor through a pipe with a bent portion and a different-diameter piping connection coupler.

FIG. 3 is a schematic diagram of a first comparison water treatment apparatus used for experiments for the purpose of verifying, through comparison, the effect of the water treatment apparatus 101 of this embodiment, the arrangement of the first comparison water treatment apparatus being such that an ejector 90 is connected with an ultraviolet radiation part 31 through a pipe 32 with a bent portion and a different-diameter piping connection coupler 33. Although the first comparison water treatment apparatus, generally designated at 200 in FIG. 3, uses the ultraviolet radiation part 31 in place of the ultraviolet radiation part 30 of this embodiment, the structure of this ultraviolet radiation part 31 is the same as that of the ultraviolet radiation part 30 of this embodiment, but has the same diameter as that of the reaction tank in the Japanese patent application laid-open No. 5-192673 previously referred to in the known art. That is, the piping diameter of the ultraviolet radiation part for comparison purpose was set so as to correspond to that of the above-mentioned known apparatus. Moreover, the ejector 90 is a one that has been generally used in the past. Instead of the oxidizer mixing part 60 of the water treatment apparatus 101 of this embodiment, the ejector 90 similar to the one used in the past is arranged at a location between the pipe 32 with the bent portion and a wastewater inlet pipe 34 into which wastewater flows. The ejector 90 is of a double cone configuration including an upstream side conical portion with a taper angle of 30 degrees, and a downstream side conical portion with a taper angle of 15 degrees disposed near the ultraviolet radiation part 31.

Figure 4:
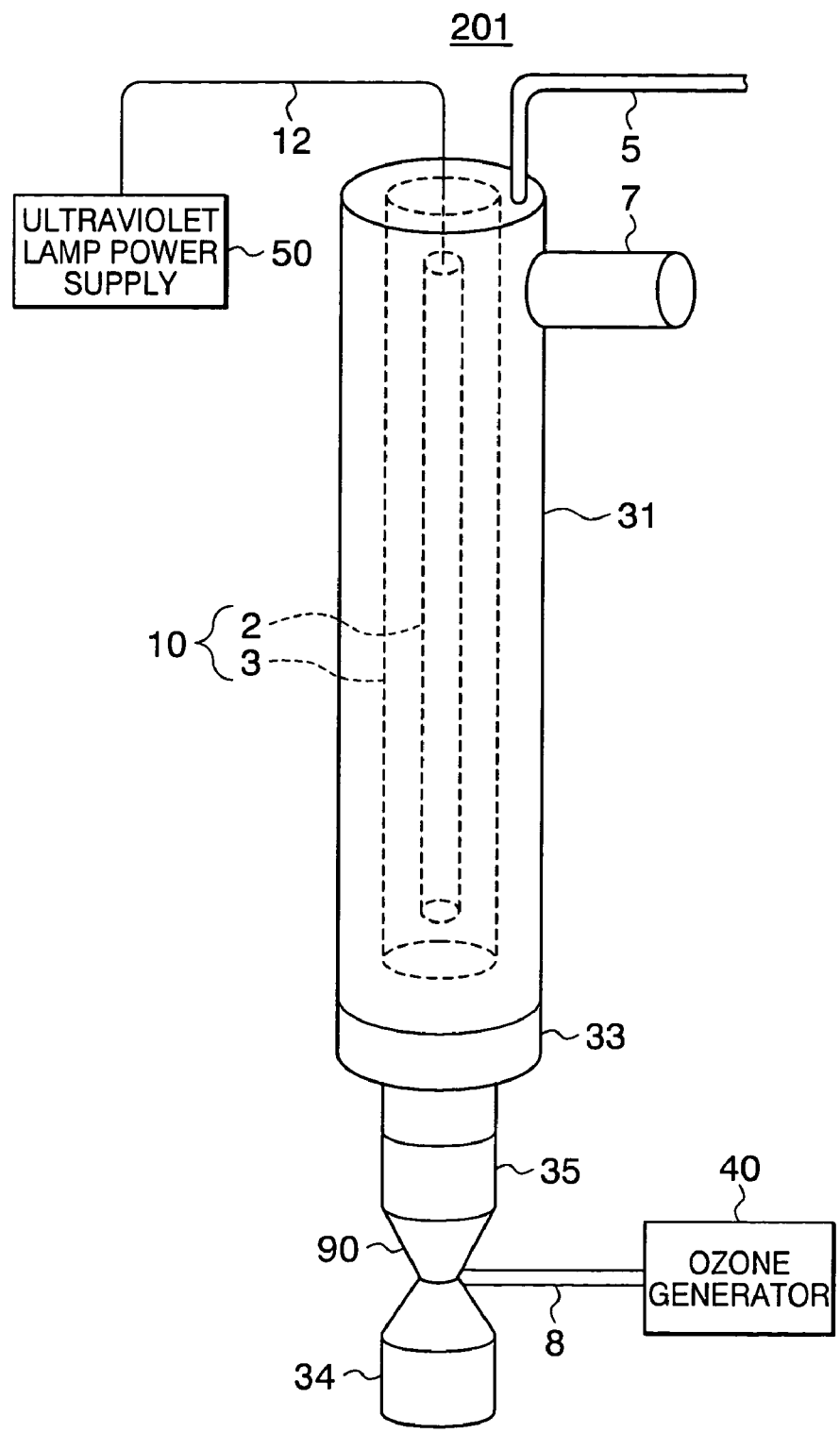
FIG. 4 is a schematic diagram illustrating the arrangement of a water treatment apparatus for comparison purpose in which an ejector is connected with a piping type reactor through a different-diameter piping connection coupler.

FIG. 4 is a schematic diagram of a second comparison water treatment apparatus used for experiments for the purpose of verifying, through comparison, the effect of the water treatment apparatus 101 of this embodiment, the arrangement of the second comparison water treatment apparatus, generally designated at 201, being such that an ejector 90 similar to the one shown in FIG. 3 is coupled with an ultraviolet radiation part 31, which is the same as that of the first comparison water treatment apparatus 200 shown in FIG. 3, through a short straight pipe 35 and a different-diameter piping connection coupler 33. The ejector 90 is arranged between the short straight pipe 35 and the wastewater inlet pipe 34 into which wastewater flows. The ejector 90 is the same as the one used in the water treatment apparatus 200 of FIG. 3.

The experimental results for the water treatment apparatuses of FIG. 3 and FIG. 4 are indicated by plots B through D in FIG. 2. Comparison between these results and the result indicated by plots A reveals that the KLa indicated by plots B through D became a bit larger and the decomposition rate of organic substances also increased to some extent with respect to those indicated at plots A. In other words, it has been found that it is possible to decrease the bubble diameters or sizes of the ozone gas as well as to increase the decomposition rate of organic substances by the use of the ejector 90 rather than by using a diffuser disc. However, the decomposition rate of organic substances was still not at a high level, and hence the inventors continued studies with a view toward seeking a method for further increasing the decomposition rate of organic substances by raising the KLa to a higher value.

As a result, it has been found that merely connecting the ejector 90 between the wastewater inlet pipe 34 and the pipe 32 or the short straight pipe 35 permits gas bubbles to coalesce or combine with one another soon at the downstream side of the ejector 90, thereby enlarging the diameters of the gas bubbles. As indicated by plots B through D in FIG. 2, it has become clear that the gas bubbles are staying in small sizes only just behind the ejector 90 in any case, but the coalescence or combination of the gas bubbles proceeds by the time they enter the reaction tank, resulting in substantially the same bubble diameters as those in the case of using the diffuser disc.

It is considered that the KLa of plot B was smaller than those of plot C and plot D since particularly with the ejector 90 being arranged in the manner as shown in FIG. 3, the coalescence of the gas bubbles proceeded rapidly at the curved or bent portion of the pipe 32. Further, plot C and plot D represent water treatment apparatuses of the same structure as shown in FIG. 4, but differ from each other in the outlet diameter De of the ejector 90 which is set to be 0.1 times for plot C and 0.3 times for plot D as large as the piping diameter Dh of the ultraviolet radiation part 31. In any of these cases, there is a part where the flow passage rapidly enlarges or expands in its diameter or size at a location between the ejector 90 and the ultraviolet radiation part 31, so the flow condition of the gas and liquid passing therethrough is disturbed to facilitate the coalescence of the gas bubbles. It is considered that the reason for the KLa being lower for plot C with a smaller outlet diameter than for plot D is that the degree of such a abrupt expansion is greater for plot C than for plot D.

In order to solve such a problem, the inventors invented the water treatment apparatus of the structure as shown in FIG. 1. Plot E in FIG. 2 indicates the experimental result for the water treatment apparatus 101 constructed as shown in FIG. 1. The result indicated by plot E reveals that the KLa and the decomposition rate of organic substances for plot E became by far greater than those for plots B through D. The reason for this is considered that the provision of the squeeze portion 20 arranged adjacent the piping type reactor 1 serves to smoothen the passage at the downstream side of the squeeze portion 20, whereby small-diameter gas bubbles generated by the squeeze portion 20 can be sent to the ultraviolet radiation part 30 without coalescence thereof, thus greatly increasing the gas-liquid interfacial area. In addition, it has been verified that with the water treatment apparatus 101 of the structure as shown in FIG. 1, the organic substances to be treated can be decomposed at a high efficiency in an extremely short period of time such as two minutes or less.

Although in this first embodiment, the ultraviolet lamp 2 was used as the ultraviolet radiation unit 10, ultraviolet light may be irradiated by using a light emitting diode and an optical fiber. In such a case, it is also proven by other experiments that a similar effect can be obtained.

Furthermore, although in this first embodiment, the piping type reactor 1 of a cylindrical configuration, i.e., a circular cross section was used, it may take any configuration other than the circular cross section, and other experiments prove that a similar effect is obtained in this case, too.

Embodiment 2

Figure 5:
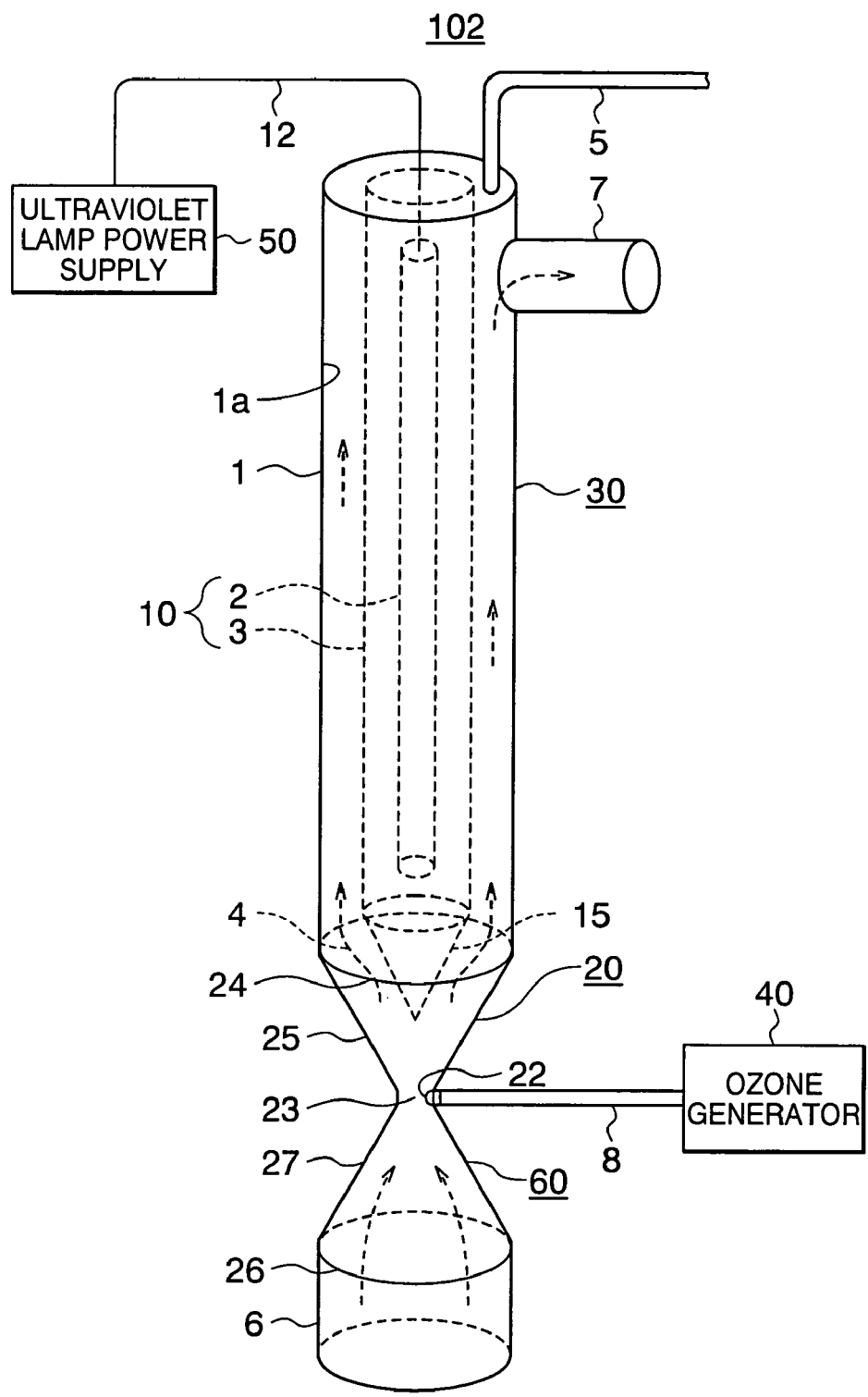
FIG. 5 is a schematic diagram illustrating the arrangement of a water treatment apparatus according to a second embodiment of the present invention.

FIG. 5 is a schematic diagram that illustrates the arrangement of a water treatment apparatus according to a second embodiment of the present invention. In FIG. 5, the water treatment apparatus, generally designated at 102, according to this second embodiment includes a cone type obstacle (hereinafter also referred to as a cone) 15 which is mounted on an upstream end portion of a lamp jacket 3. The construction of this second embodiment other than the above is similar to that of the first embodiment, and hence a detailed explanation thereof is omitted, while identifying the same or corresponding parts or members by the same symbols.

Now, the operation of this second embodiment will be described below. First of all, wastewater flows into the piping type reactor 1 through the wastewater inlet pipe 6. In the squeeze portion 20, an ozone gas is sucked or drawn therein, so that a large amount of fine bubbles of the ozone gas is thereby generated in the wastewater. At this time, the fine bubbles flow in an annular space defined between the inner wall of the piping type reactor 1 and the cone 15 to reach the neighborhood of the ultraviolet lamp 2. In the neighborhood of the ultraviolet lamp 2, highly oxidizing hydroxyl radicals are generated by the reaction of the dissolved ozone and the ultraviolet light irradiated from the ultraviolet lamp 2 that is lit by application thereto of a voltage from the ultraviolet lamp power supply 50 through the electric wire 12. The hydroxyl radicals oxidize and decompose the substances to be treated in the wastewater, and the cleaned or purified wastewater is discharged from the treated water outlet pipe 7. In addition, a part of ozone gas which has not been able to be dissolved in the wastewater, i.e., an exhaust ozone gas, is escaped to the outside of the system through the exhaust ozone gas discharge pipe 5.

As stated above, by installing the cone 15 at the bottom of the lamp jacket 3, the wastewater containing therein fine gas bubbles generated in the squeeze portion 20 of the piping type reactor 1 is prevented from impinging or colliding against the bottom of the lamp jacket 3 to disturb the flow condition thereof, whereby the coalescence and resultant enlargement of the fine gas bubbles due to the disturbance of the flow condition of the wastewater can be avoided. As a result, the gas-liquid interfacial area in the ultraviolet radiation part becomes increased. That is, in addition to the effect of the first embodiment, there is obtained another effect that the decomposition rate of the substances to be treated can be further enhanced.

Figure 6:
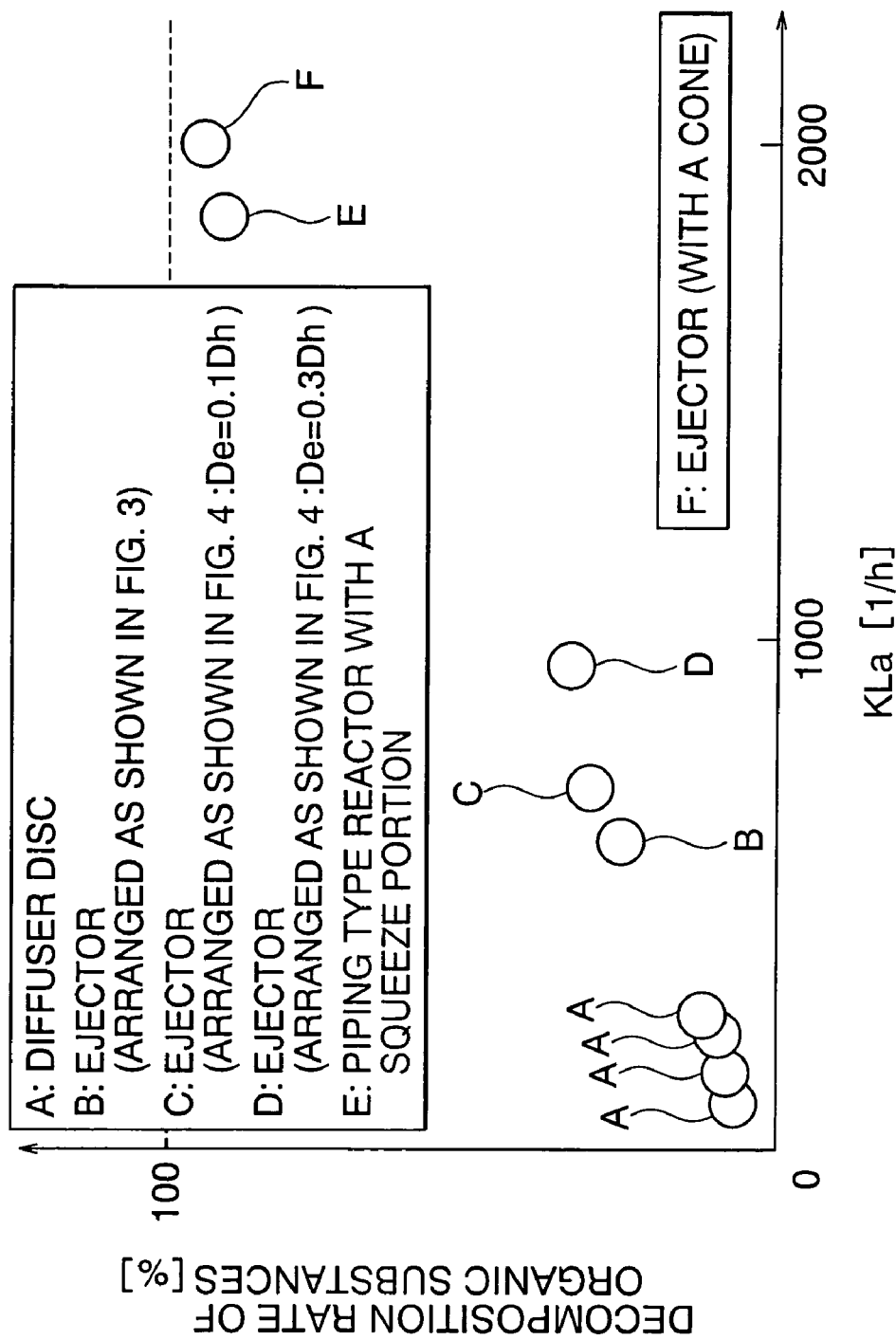
FIG. 6 is a characteristic view illustrating the effect of the water treatment apparatus according to the second embodiment.

FIG. 6 is a view explaining such an effect, while illustrating the result of experiments for obtaining the relation between the KLa and the decomposition rate of the organic substances to be treated in the case of the apparatus with the cone 15 shown in FIG. 5 (i.e., indicated by plot F in this figure), in addition to the results of experiments shown in FIG. 2. Here, note that the water treatment apparatus 102 used for the experiments comprises the water treatment apparatus 101 of FIG. 1 with the cone 15 attached thereto. The cone 15 having a taper angle of 15 degrees was used, that is, a cone of the same taper angle as that of the first conical part 25 was used. As shown in FIG. 6, by the provision of the cone 15, the KLa became a bit larger as compared with the one shown in the first embodiment (plot E), so that the decomposition rate of organic substances reached 95% or more.

Although in this second embodiment, the ultraviolet lamp 2 was used as the ultraviolet radiation unit 10, ultraviolet light may be irradiated by using a light emitting diode and an optical fiber. In such a case, it is also proven by other experiments that a similar effect can be obtained.

In addition, although in this second embodiment, the cone 15 is shown as used for avoiding the collision and coalescence of gas bubbles, the shape or configuration of the ultraviolet radiation unit 10 may instead be properly designed, e.g., the bottom of the lamp jacket 3 may be shaped into a conical configuration, as shown by the cone 15, and in such a case, it is proven by other experiments that a similar effect can be obtained.

Moreover, although in this second embodiment, the piping type reactor 1 of a cylindrical configuration, i.e., a circular cross section was used, it may take any configuration other than the circular cross section, and other experiments prove that a similar effect is obtained in this case, too.

Embodiment 3

Figure 7:
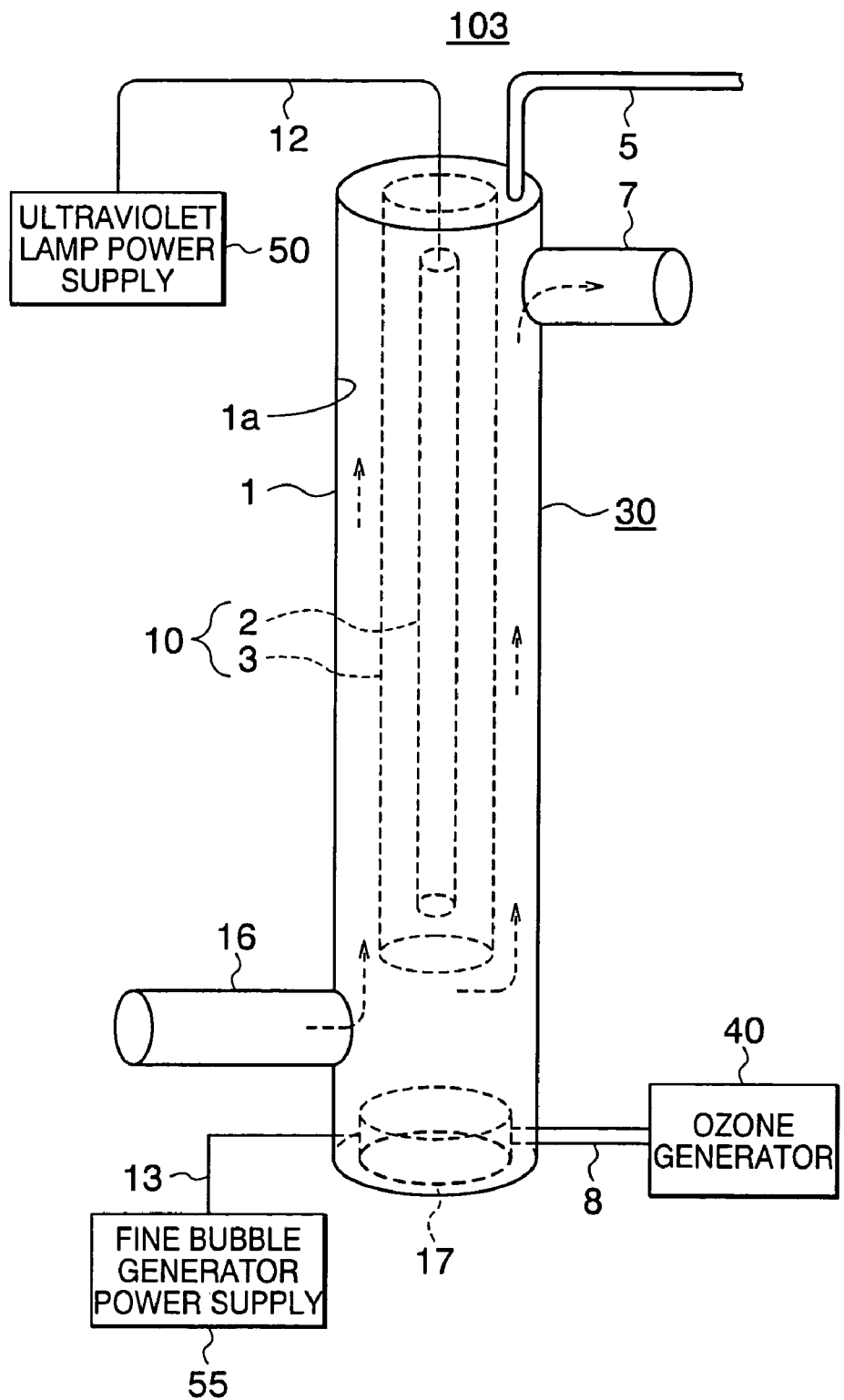
FIG. 7 is a schematic diagram illustrating the arrangement of a water treatment apparatus according to a third embodiment of the present invention.

FIG. 7 is a schematic diagram that illustrates the arrangement of a water treatment apparatus according to a third embodiment of the present invention. In FIG. 7, the water treatment apparatus, generally designated at 103, according to this third embodiment has a fine bubble generator 17 arranged at the upstream side of an ultraviolet radiation part 30. The fine bubble generator 17 is formed on its surface with unillustrated fine ozone gas pores. The fine bubble generator 17 is driven by electric power supplied from a fine bubble generator power supply 55 through an electric wire 13 to eject, from the ozone gas pores, an ozone gas supplied from an ozone generator 40 via an ozone pipe 8.

In addition, a wastewater inlet pipe 16, into which wastewater flows, is connected with an upstream side of the ultraviolet radiation part 30.

The construction of this third embodiment other than the above is similar to that of the first embodiment, and hence a detailed explanation thereof is omitted, while identifying the same or corresponding parts or members by the same symbols.

Now, the operation of this third embodiment will be described below. First of all, wastewater flows into the piping type reactor 1 through the wastewater inlet pipe 16. Also, an ozone gas generated by the ozone generator 40 is sent to the fine bubble generator 17 through the ozone pipe 8. The fine gas bubbles of small diameters generated by the fine bubble generator 17 are dispersed into the wastewater that has flowed into the piping type reactor 1. The ozone gas in the fine bubbles is turned into dissolved ozone as it moves into a liquid phase, so that highly oxidizing hydroxyl radicals are generated by the reaction of the dissolved ozone and the ultraviolet light irradiated from the ultraviolet lamp 2 that is lit by application thereto of a voltage from the ultraviolet lamp power supply 50 through the electric wire 12. The hydroxyl radicals oxidize and decompose the substances to be treated in the wastewater, and the thus cleaned or purified wastewater is discharged from the treated water outlet pipe 7. In addition, a part of ozone gas which has not been able to be dissolved in the wastewater, i.e., an exhaust ozone gas, is escaped to the outside of the system through the exhaust ozone gas discharge pipe 5.

Thus, since the apparatus according to this third embodiment uses the fine bubble generator 17 as an oxidizer mixing means, the diameters of the ozone gas bubbles can be made smaller as compared with known apparatuses in which an ozone gas is caused to be absorbed into the wastewater by the use of a diffuser, whereby the gas-liquid interfacial area is increased, thus making it possible to facilitate the dissolution of ozone into the liquid phase. That is, by facilitating the generation of hydroxyl radicals, there can be achieved an effect equivalent to that of the first embodiment.

Figure 8:
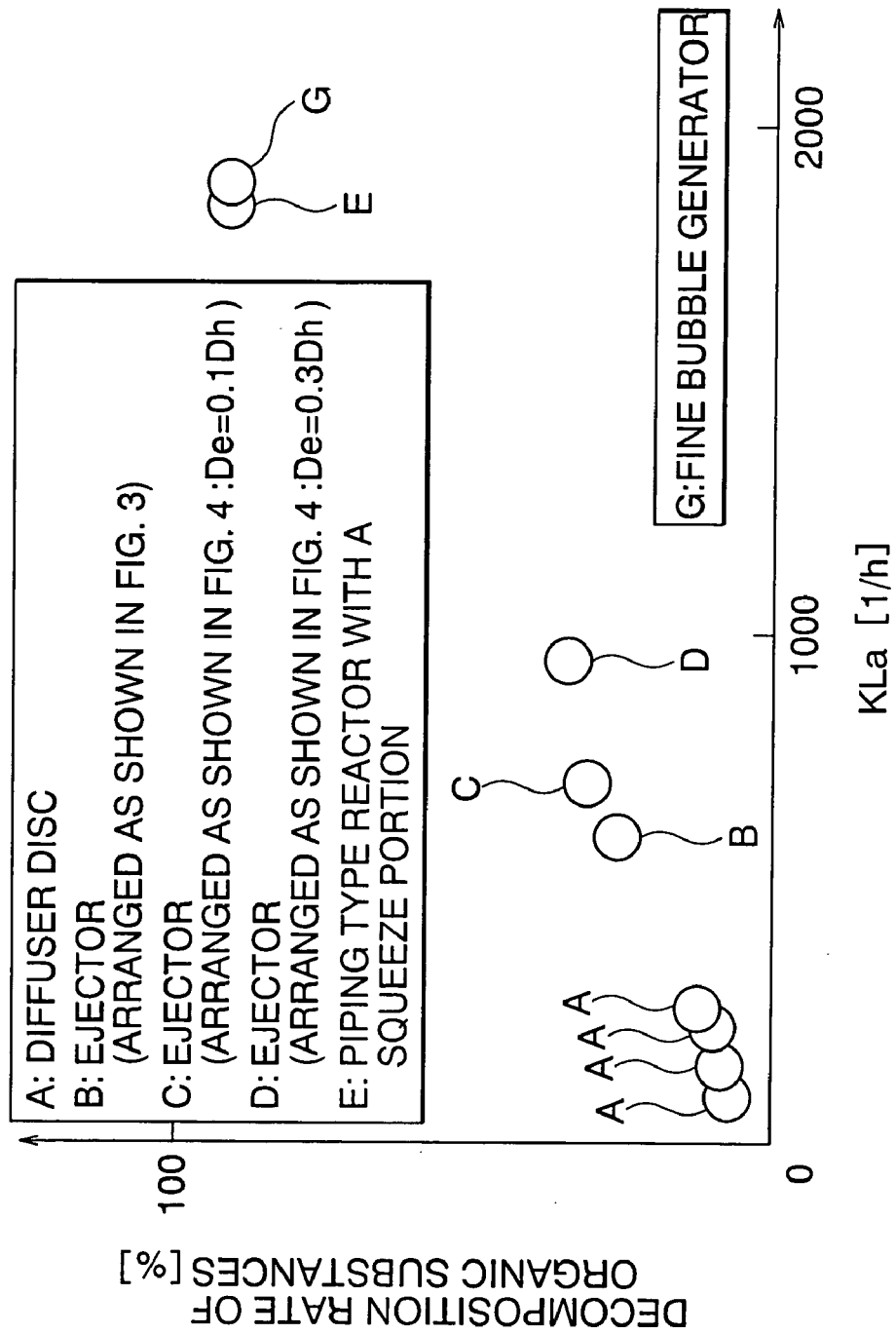
FIG. 8 is a characteristic view illustrating the effect of the water treatment apparatus according to the third embodiment.

FIG. 8 is a view explaining such an effect, while illustrating the result of experiments for obtaining the relation between the KLa and the decomposition rate of the organic substances to be treated in the case of the apparatus having the fine bubble generator as an oxidizer mixing means in place of the squeeze portion, as shown in FIG. 7 (i.e., indicated by plot G in this figure), in addition to the results of experiments shown in FIG. 2. As shown in FIG. 8, the KLa and the decomposition rate of organic substances when the fine bubble generator is used are substantially the same as those shown in the first embodiment (plot E), and hence it can be said that this third embodiment employing the fine bubble generator provides an effect equivalent to that of the first embodiment.

Although in this third embodiment, the ultraviolet lamp 2 was used as the ultraviolet radiation unit 10, ultraviolet light may be irradiated by using a light emitting diode and an optical fiber. In such a case, it is also proven by other experiments that a similar effect can be obtained.

Moreover, although in this third embodiment, the piping type reactor 1 of a cylindrical configuration, i.e., a circular cross section was used, it may take any configuration other than the circular cross section, and other experiments prove that a similar effect is obtained in this case, too.

Embodiment 4

A water treatment apparatus according to a fourth embodiment of the present invention is substantially the same in construction as that of the first embodiment, but it is different therefrom in that the distance from the small diameter portion (minimum sectional area part) of the squeeze portion 20 of the water treatment apparatus 101 to an end of the ultraviolet lamp jacket 3 near the squeeze portion 20, as shown in FIG. 1, was set to be 50 cm or less, preferably 20 cm or less.

Figure 9:
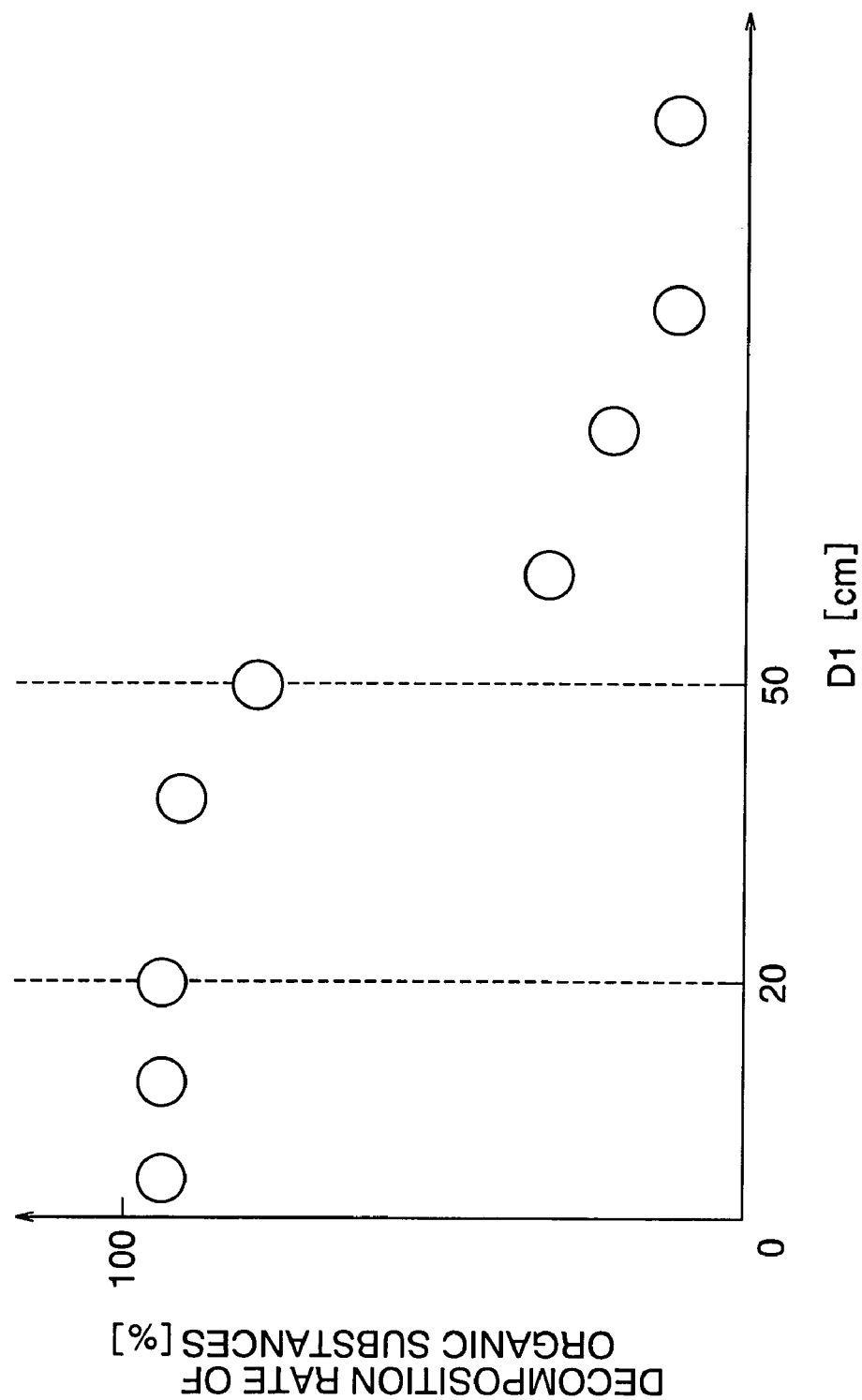
FIG. 9 is a characteristic view illustrating the effect of a water treatment apparatus according to a fourth embodiment of the present invention.

FIG. 9 shows the results of experiments in which there was examined the relation between a distance D1 from the small diameter portion (minimum sectional area part) 23 of the squeeze portion 20 of the water treatment apparatus 101 to an end of the ultraviolet lamp jacket 3 near the squeeze portion 20 in the first embodiment, as shown in FIG. 1, and the decomposition rate of organic substances. Here, note that experimental conditions of this embodiment are the same as those which have been explained as the experimental conditions of FIG. 2 in the first embodiment.

As shown in FIG. 9, the smaller the distance D1, the higher did the decomposition rate of organic substances become. This is because the shorter the distance from a location at which the ozone gas is mixed with the wastewater to a location at which ultraviolet light of enough strength is irradiated onto the wastewater, the faster the fine bubbles are able to reach the neighborhood of the ultraviolet lamp 2 before the bubble diameters or sizes are enlarged due to the coalescence of the gas bubbles. That is, the generation of hydroxyl radicals due to the reaction between the ozone and the ultraviolet light can be facilitated in a state in which the dissolution speed of the ozone is high. When the distance D1 is 50 cm and 20 cm, the decomposition rate of organic substances is 90% and 97.5% or more, respectively, as shown in FIG. 9, and hence it was found that to decompose the organic substances at a high-efficiency, the distance D1 must be 50 cm or less, preferably 20 cm or less.

As stated above, in this fourth embodiment, the distance D1 from the small diameter portion (minimum sectional area part) 23 of the squeeze portion 20 of the water treatment apparatus 101 to an end of the ultraviolet lamp jacket 3 near the squeeze portion 20 in the first embodiment, as shown in FIG. 1, was set to be between 0.001 cm and 50 cm, inclusive, preferably between 0.001 cm and 20 cm, inclusive. As a result, there is obtained an effect that the decomposition rate of the organic substances to be treated becomes high.

Embodiment 5

A water treatment apparatus according to a fifth embodiment of the present invention is substantially the same in construction as that of the first embodiment, but it is different therefrom in that the distance from the small diameter portion (minimum sectional area part) 23 of the squeeze portion 20 of the water treatment apparatus 101, as shown in FIG. 1, to a location at which the strength of ultraviolet light becomes 100 W/cm$^2$ was set to be 50 cm or less, preferably 20 cm or less.

Figure 10:
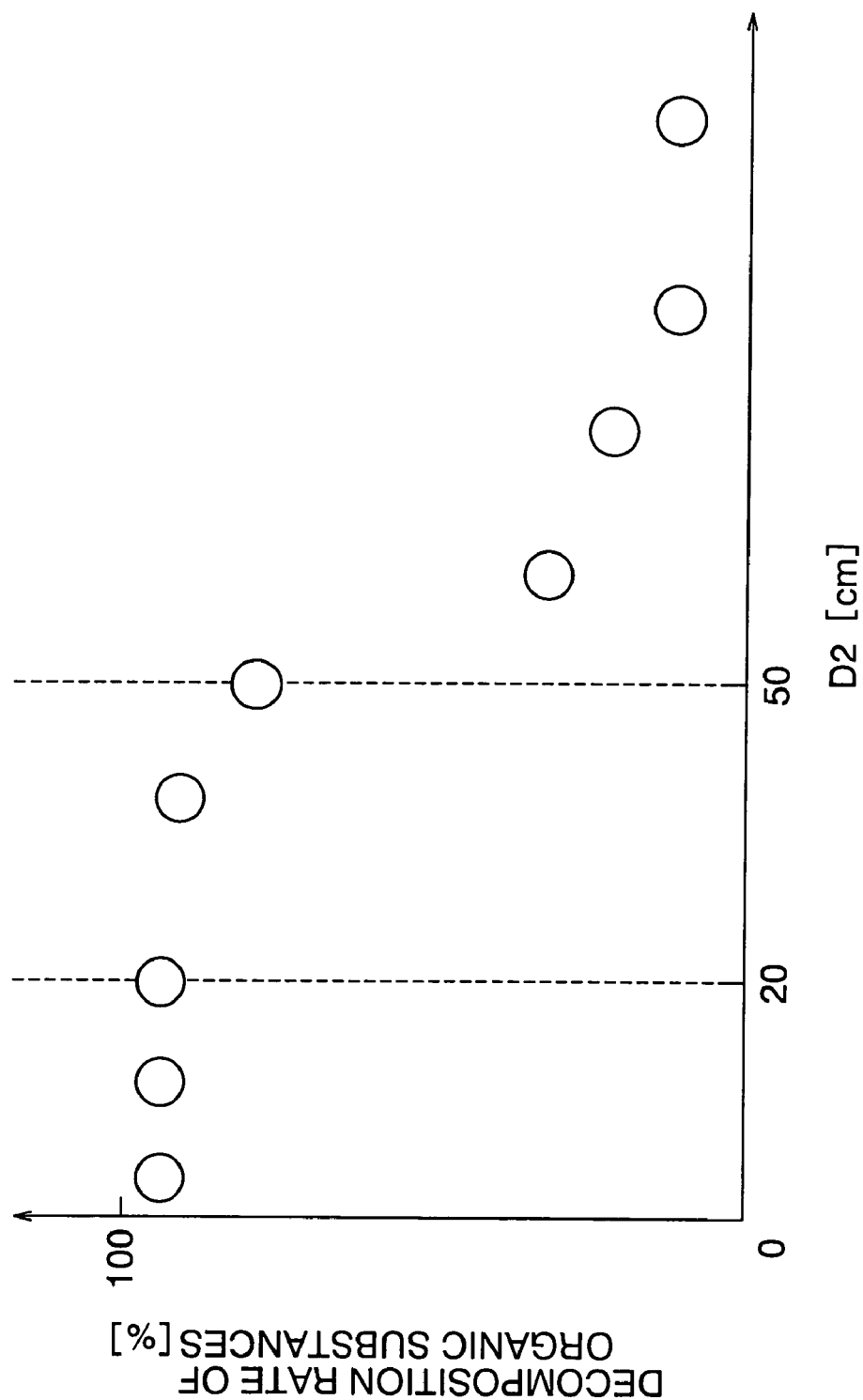
FIG. 10 is a characteristic view illustrating the effect of a water treatment apparatus according to a fifth embodiment of the present invention.

FIG. 10 shows the results of experiments in which there was examined the relation between a distance D2 from the small diameter portion (minimum sectional area part) 23 of the squeeze portion 20 of the water treatment apparatus 101 in the first embodiment, as shown in FIG. 1, to a location at which the strength of ultraviolet light is 100 W/cm$^2$, and the decomposition rate of organic substances. Here, note that experimental conditions of this fifth embodiment are the same as those which have been explained as the experimental conditions of FIG. 2 in the first embodiment.

As shown in FIG. 10, the smaller the distance D2 the higher did the decomposition rate of organic substances become. This is because the shorter the distance from a location at which the ozone gas is mixed with the wastewater to a location at which ultraviolet light of enough strength is irradiated onto the wastewater, the faster the fine bubbles are able to reach the neighborhood of the ultraviolet lamp before the bubble diameters or sizes are enlarged due to the coalescence of the gas bubbles. That is, the generation of hydroxyl radicals due to the reaction between the ozone and the ultraviolet light can be facilitated in a state in which the dissolution speed of the ozone is high. When the distance D2 is 50 cm and 20 cm, the decomposition rate of organic substances is 90% and 95% or more, respectively, as shown in FIG. 10, and hence, it was found that to decompose the organic substances at a high efficiency, the distance D2 must be 50 cm or less, preferably 20 cm or less.

As stated above, in this fifth embodiment, the distance from the small diameter portion (minimum sectional area part) 23 of the squeeze portion 20 of the water treatment apparatus 101 in the first embodiment, as shown in FIG. 1, to a location at which the strength of ultraviolet light becomes 100 W/Cm$^2$ or more was set to be between 0.001 cm and 50 cm, inclusive, preferably between 0.001 cm and 20 cm, inclusive. As a result, there is obtained an effect that the decomposition rate of the organic substances to be treated becomes high.

Embodiment 6

Figure 11:
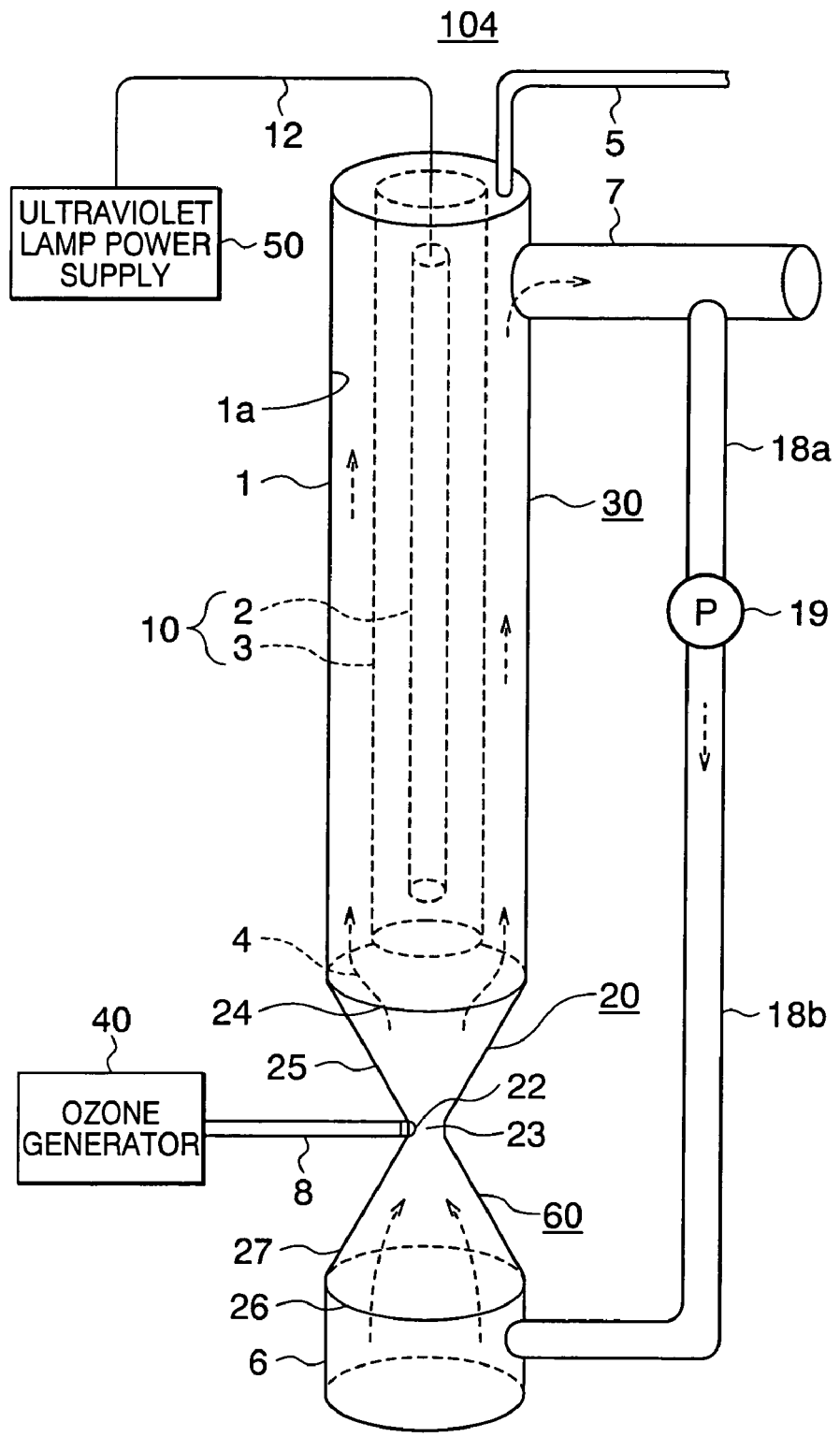
FIG. 11 is a schematic diagram illustrating the arrangement of a water treatment apparatus according to a sixth embodiment of the present invention.

FIG. 11 is a schematic diagram illustrating the arrangement of a water treatment apparatus according to a sixth embodiment of the present invention. In FIG. 11, the water treatment apparatus, generally designated at 104, according to this sixth embodiment further includes a circulation flow passage for returning the treated water after having passed an ultraviolet radiation part 30 to an upstream side of a small diameter portion 23 of a squeeze portion 20 (minimum sectional area part). The circulation flow passage includes a pipe 18a branching from the treated water outlet pipe 7, a pipe 18b connected with the wastewater inlet pipe 16, and a pump 19 arranged between the pipe 18a and the pipe 18b.

The construction of this sixth embodiment other than the above is similar to that of the first embodiment, and hence a detailed explanation thereof is omitted, while identifying the same or corresponding parts or members by the same symbols.

Now, the operation of this sixth embodiment will be described below. First of all, wastewater flows into the piping type reactor 1 through the wastewater inlet pipe 6. In the squeeze portion 20, an ozone gas is sucked or drawn therein, so that a large amount of fine bubbles of the ozone gas is thereby generated in the wastewater. The ozone gas in the fine bubbles is turned into dissolved ozone as it moves into a liquid phase, so that highly oxidizing hydroxyl radicals are generated by the reaction of the dissolved ozone and the ultraviolet light irradiated from the ultraviolet lamp 2 that is lit by application thereto of a voltage from the ultraviolet lamp power supply 50 through the electric wire 12. The hydroxyl radicals oxidize and decompose the substances to be treated in the wastewater, and the cleaned or purified wastewater is discharged from the treated water outlet pipe 7, but a part of the cleaned or purified wastewater is returned to a location just before the squeeze portion 20 by means of the pump 19 through the pipe 18a and the pipe 18b. As a result, the flow rate of the liquid passing through the squeeze portion 20 increases, whereby the force to suck or draw and mix the ozone gas from the oxidizer suction port 22 becomes greater. That is, the bubble diameters or sizes of the ozone gas become smaller due to the stronger mixing of the gas and liquid, thus making it possible to facilitate the dissolution of ozone into the liquid phase. Accordingly, in addition to the effect of the first embodiment, there is obtained another effect that the decomposition rate of the substances to be treated can be further enhanced.

Figure 12:
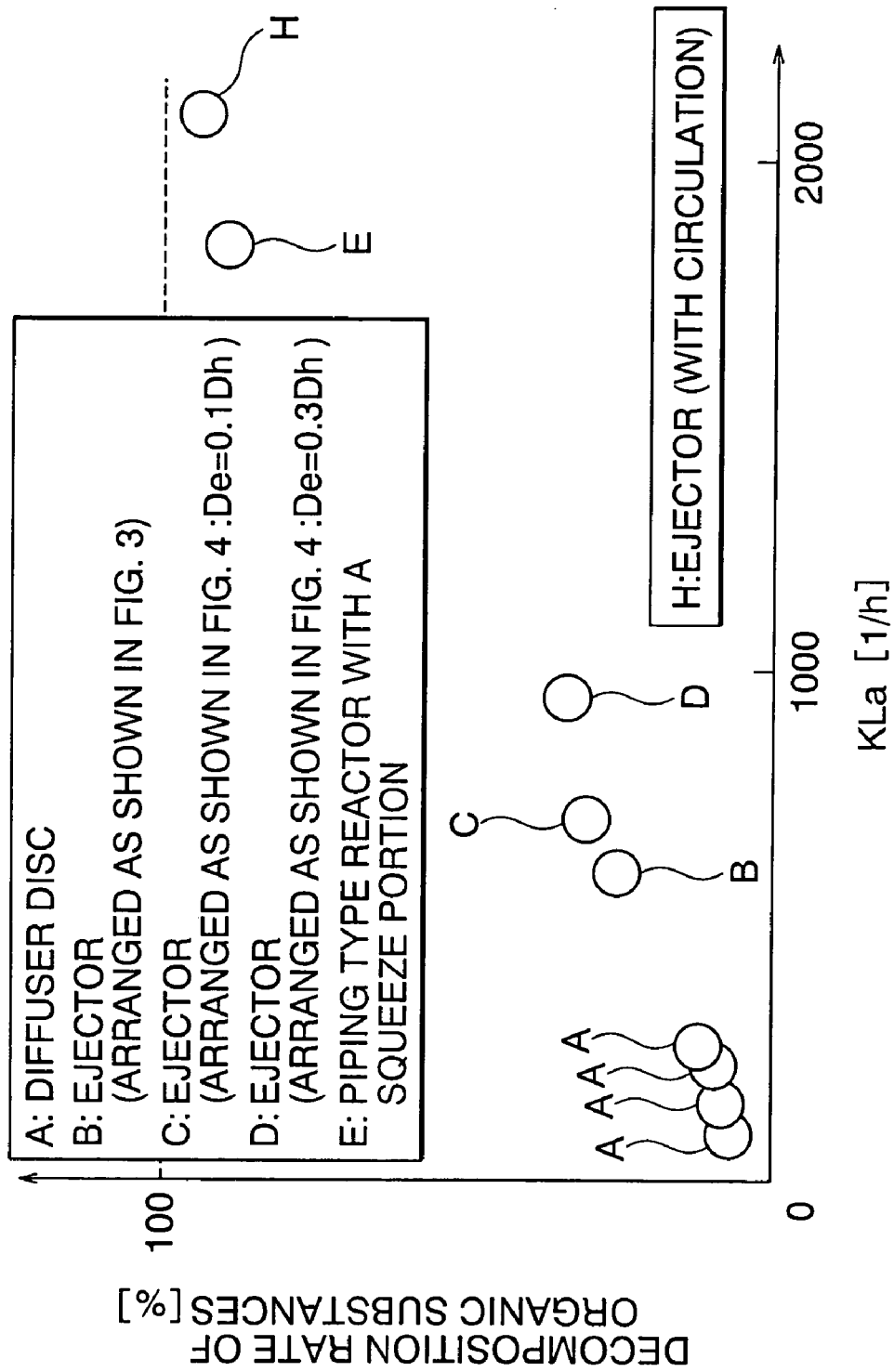
FIG. 12 is a characteristic view illustrating the effect of the water treatment apparatus according to the sixth embodiment.

FIG. 12 is a view explaining such an effect, while illustrating the result of experiments for obtaining the relation between the KLa and the decomposition rate of the organic substances to be treated in the case of the water treatment apparatus 104 with the circulation flow passage in which the water discharged as effluent is drawn and returned, for circulation, to the upstream side of the squeeze portion 20 at a circulation flow rate 6 L/min, as described above with reference to the sixth embodiment (i.e., indicated by plot H in this figure), in addition to the results of experiments shown in FIG. 2. As shown in FIG. 10, the KLa in this sixth embodiment becomes larger as compared with the one shown in the first embodiment (plot E), so that the decomposition rate of organic substances reached 95% or more.

Here, note that in the inventors' experiments, it has been verified that by setting the circulation flow rate to be 50% or more, preferably 100% or more, of the flow rate of the water to be treated, the increase of the ozone gas suction or drawing force at the squeeze portion 20 became remarkable.

Although in this sixth embodiment, the ultraviolet lamp 2 was used as the ultraviolet radiation unit 10, ultraviolet light may be irradiated by using a light emitting diode and an optical fiber. In such a case, it is also proven by other experiments that a similar effect can be obtained.

In addition, although in this sixth embodiment, the piping type reactor 1 of a cylindrical configuration, i.e., a circular cross section was used, it may take any configuration other than the circular cross section, and other experiments prove that a similar effect is obtained in this case, too.

Moreover, although in this sixth embodiment, there was illustrated an example in which a part of the treated water flowing out of the treated water outlet pipe 7 was drawn, the treated water may be directly drawn from the piping type reactor 1, and in this case, it is also proven by other experiments that a substantially similar effect can be obtained.

Further, although in this sixth embodiment, there was illustrated an example in which the drawn water was returned to just before the squeeze portion 20, the drawn water may be returned anywhere at the upstream side of the squeeze portion 20, and in this case, too, it is proven by other experiments that a similar effect can be obtained.

Embodiment 7

Although a water treatment apparatus according to a seventh embodiment of the present invention is substantially the same in construction as that of the first embodiment, the diameter of the piping type reactor 1 in this seventh embodiment is determined in such a manner that an inner wall surface ultraviolet light strength, i.e., the strength of ultraviolet light irradiated from the ultraviolet radiation part 30 of the water treatment apparatus 101 onto the inner wall surface 1a of the piping type reactor 1, as shown in FIG. 1, becomes 30 W/M$^2$ or more, preferably 100 W/m$^2$ or more.

Figure 13:
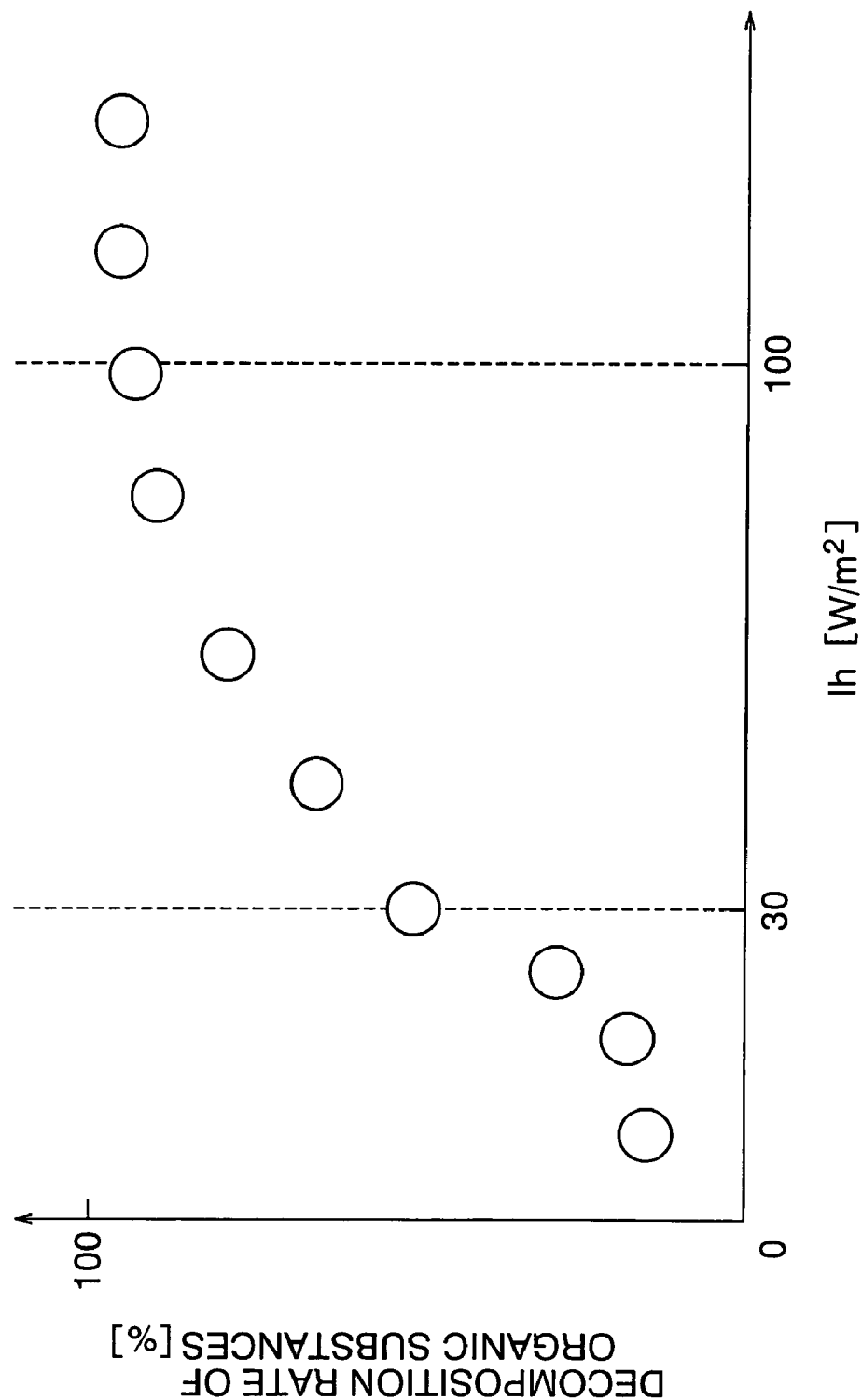
FIG. 13 is a characteristic view illustrating the effect of a water treatment apparatus according to a seventh embodiment of the present invention.

FIG. 13 illustrates the results of experiments in which the relation between the strength of ultraviolet light Ih at the inner wall surface 1a of the piping type reactor 1 and the decomposition rate of organic substances was examined in the course of water treatment, while taking, as a parameter, the piping diameter of the piping type reactor 1 in the first embodiment shown in FIG. 1, and assuming that the residence or retention time of the wastewater in the piping type reactor was 5 minutes; the TOC concentration of the wastewater was 10 mg/L; G/L (i.e., the ratio between the flow rate of the ozone gas and the flow rate of the wastewater) was 0.5; the concentration of the ozone gas was 200 g/m$^3$(N); and the output power of the ultraviolet lamp was 110 W.

As shown in FIG. 13, it was found that the smaller the strength of ultraviolet light Ih, the higher did the decomposition rate of organic substances become, and if Ih was 30 W/m$^2$ or less, the decomposition rate of organic substances was very low. From FIG. 13, it has also been found that to decompose the organic substances at a high efficiency, the strength of ultraviolet light Ih must be 30 W/m$^2$ or more, preferably 100 W/m$^2$ or more.

As stated above, in this seventh embodiment, the diameter of the piping type reactor 1 is determined in such a manner that the inner wall surface ultraviolet light strength, i.e., the strength of ultraviolet light irradiated from the ultraviolet radiation part 30 of the water treatment apparatus 101 onto the inner wall surface 1*a* of the piping type reactor 1, as shown in FIG. 1, becomes 30 W/m$^2$ or more, preferably 100 W/m$^2$ or more, but 100,000 W/m$^2$ or less. As a result, there is obtained an effect that the decomposition rate of the organic substances to be treated becomes high.

Embodiment 8

Although a water treatment apparatus according to an eighth embodiment of the present invention is substantially the same in construction as that of the first embodiment, the diameter of the piping type reactor 1 in this eighth embodiment is determined in such a manner that an inner wall surface ultraviolet light strength, i.e., the strength of ultraviolet light irradiated from the ultraviolet radiation part 30 of the water treatment apparatus 101 shown in FIG. 1 onto the inner wall surface 1*a* of the piping type reactor 1 becomes 10% or more, preferably 30% or more, of the strength of ultraviolet light at the ultraviolet irradiation surface 3*a* of the ultraviolet irradiation unit 10.

Figure 14:
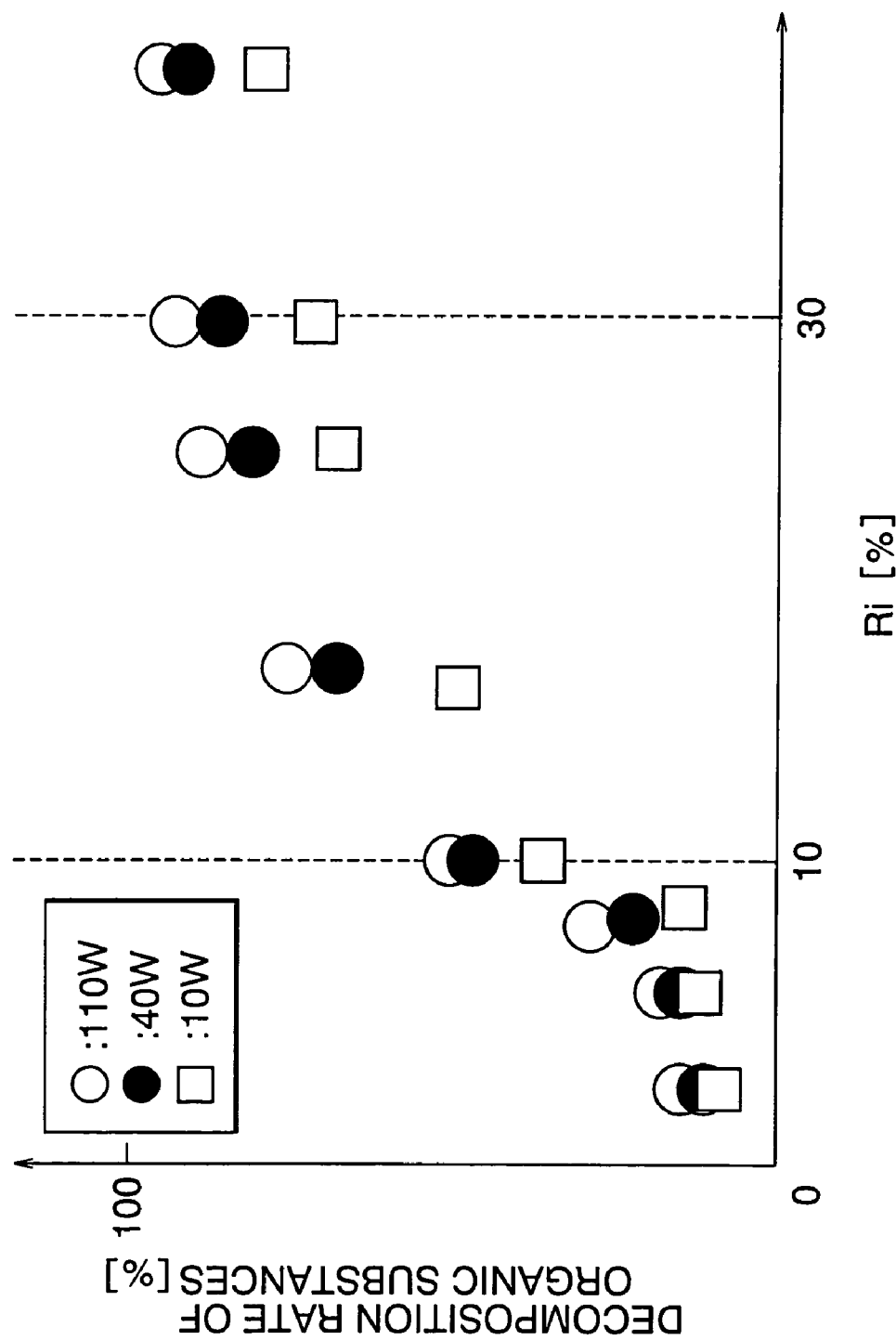
FIG. 14 is a characteristic view illustrating the effect of a water treatment apparatus according to an eighth embodiment of the present invention.

FIG. 14 illustrates the results of experiments in which the relation between the ratio Ri between the strength of ultraviolet light at the inner wall surface 1*a* of the piping type reactor 1 and the strength of ultraviolet light at the surface of the lamp jacket 3, and the decomposition rate of organic substances was examined in the course of a water treatment process, while taking, as a parameter, the piping diameter of the piping type reactor 1 in the first embodiment shown in FIG. 1, on the conditions that the residence or retention time of the wastewater in the piping type reactor was 5 minutes; the TOC concentration of the wastewater was 10 mg/L; G/L (i.e., the ratio between the flow rate of the ozone gas and the flow rate of the wastewater) was 0.5; the concentration of the ozone gas was 200 g/m$^3$(N); and the output power of the ultraviolet lamp was 110 W, 40 W and 10 W, respectively.

As shown in FIG. 14, it was found that the greater the ratio Ri, the higher did the decomposition rate of organic substances become irrespective of the output power of the ultraviolet lamp, and if Ri was 10% or less, the decomposition rate of organic substances was very low. From FIG. 14, it was also found that to decompose the organic substances at a high efficiency, the ratio Ri must be 10% or more, preferably 30% or more.

Although a water treatment apparatus according to this eighth embodiment of the present invention is substantially the same in construction as that of the first embodiment, the diameter of the piping type reactor 1 is determined in such a manner that the inner wall surface ultraviolet light strength, i.e., the strength of ultraviolet light irradiated from the ultraviolet radiation part 30 of the water treatment apparatus 101 shown in FIG. 1 onto the inner wall surface 1*a* of the piping type reactor 1 becomes 10% or more, preferably 30% or more, but 100% or less, of the strength of ultraviolet light at the ultraviolet irradiation surface 3*a* of the ultraviolet irradiation unit 10. As a result, there is obtained an effect that the decomposition rate of the organic substances to be treated becomes high.

Embodiment 9

Figure 15:
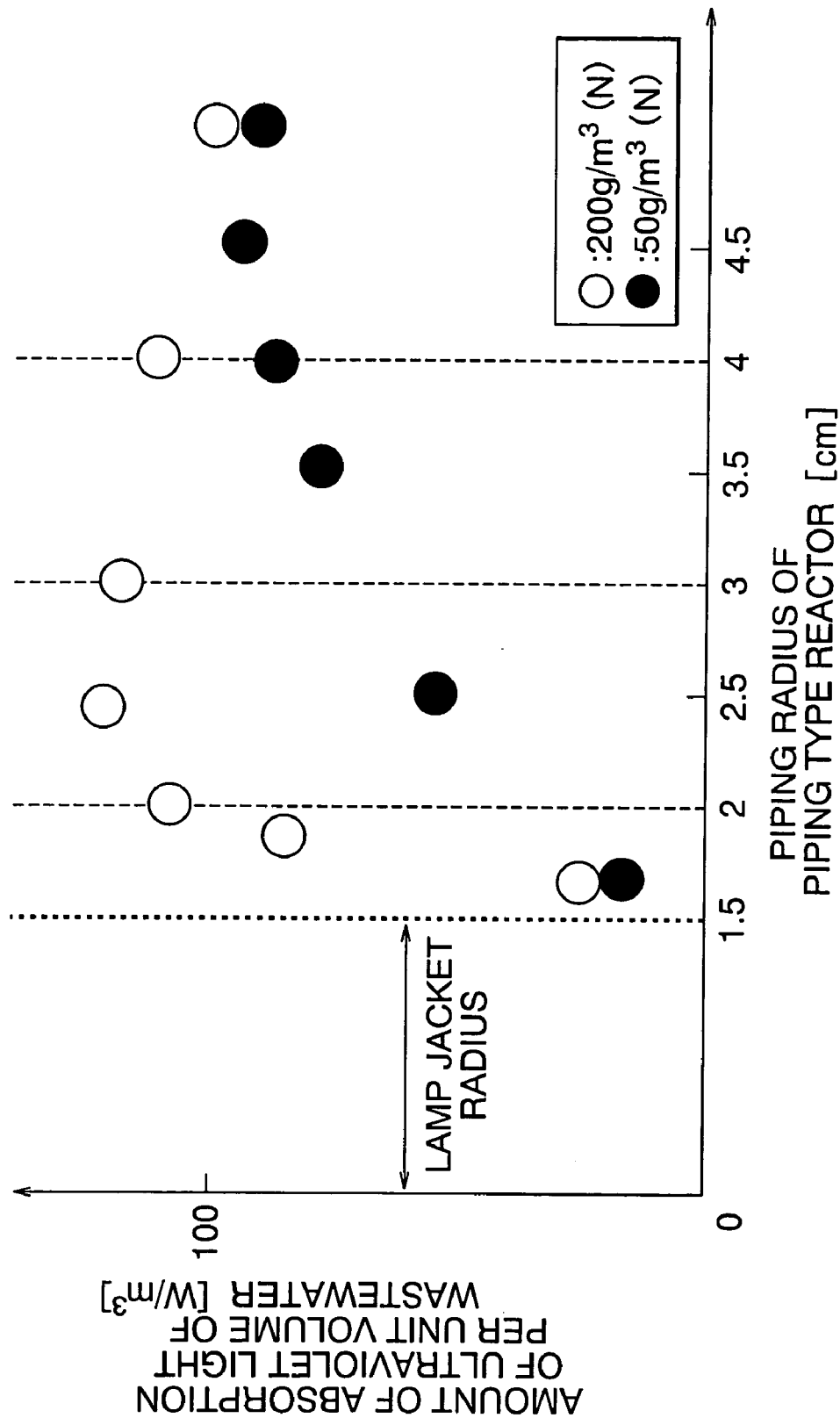
FIG. 15 is a characteristic view illustrating the effect of a water treatment apparatus according to a ninth embodiment of the present invention.

Although a water treatment apparatus according to a ninth embodiment of the present invention is substantially the same in construction as that of the first embodiment, the piping radius of the piping type reactor 1 of the water treatment apparatus 101 shown in FIG. 1 was set to be between 2 cm and 4 cm, inclusive, preferably between 2 cm and 3 cm, inclusive. FIG. 15 illustrates the results of experiments in which the relation between the piping radius of the piping type reactor 1 and the ultraviolet dose (i.e., the amount of absorption of ultraviolet light) per unit volume of the wastewater was examined in the water treatment apparatus 101 according to the first embodiment shown in FIG. 1, on the conditions that the TOC concentration of the wastewater was 10 mg/L; G/L (i.e., the ratio between the flow rate of the ozone gas and the flow rate of the wastewater) was 0.5; the concentration of the ozone gas was 200 g/m$^3$(N) or 50 g/m$^3$(N); and the output power of the ultraviolet lamp was 110 W. As shown in FIG. 15, in the case of the ozone gas concentration being 200 g/m$^3$(N), the amount of absorption of ultraviolet light per unit volume of the wastewater became a maximum when the piping radius of the piping type reactor was 2.5 cm, whereas in the case of the ozone gas concentration being 50 g/m$^3$(N), the amount of ultraviolet absorption became a maximum when the piping or reactor diameter was 4.5 cm.

The reason for the amount of absorption of ultraviolet light per unit volume to take a maximum value at a certain reactor diameter in this manner is as follows. That is, when the reactor diameter is too small, the ultraviolet light irradiated can not be absorbed to a satisfactory extent and hence is wasted, whereas conversely, when the reactor diameter is too large, a sufficient amount of ultraviolet light can not reach areas apart from the ultraviolet lamp 2 because the ultraviolet light is absorbed by the ozone dissolved in the wastewater and hydrogen peroxide or the like necessarily generated as a byproduct in a reactive system of ozone and ultraviolet light. In addition, the reason why the higher the ozone gas concentration, the smaller becomes the piping or reactor diameter at which the amount of absorption of ultraviolet light per unit volume of the wastewater becomes a maximum is that the higher the ozone gas concentration, the higher become the concentration of ozone dissolved in the wastewater and the concentration of hydrogen peroxide in the form of a byproduct, thus facilitating the absorption of ultraviolet light.

From the above result, in the water treatment apparatus employing a combination of ozone and ultraviolet light, it is possible to know an effective range of the piping radius or cross sectional area of the piping type reactor for effective use of irradiated ultraviolet light, i.e., an effective range of ultraviolet radiation, which has not at all been known up to now. In particular, it has been found that when the ozone gas has a high concentration of about 200 g/m$^3$(N), the piping radius of the piping type reactor in the first embodiment as shown in FIG. 1 must be between 2 cm and 4 cm, inclusive, preferably between 2 cm and 3 cm, inclusive.

As described above, in this ninth embodiment, the piping radius of the piping type reactor in the first embodiment as shown in FIG. 1 was set to be between 2 cm and 4 cm, inclusive, preferably between 2 cm and 3 cm, inclusive. As a result, there is obtained an effect that the irradiated ultraviolet light can be effectively utilized, thereby enhancing the decomposition rate of the organic substances to be treated.

Embodiment 10

A water treatment apparatus according to a tenth embodiment of the present invention is substantially the same in construction as that of the first embodiment, but in this tenth embodiment, the distance between the inner wall surface $1a$ of the piping type reactor 1 of the water treatment apparatus 101 and the ultraviolet radiation surface $3a$ of the ultraviolet radiation unit 10 as shown in FIG. 1 was set to be between 5 mm and 25 mm, inclusive, preferably between 5 mm and 15 mm, inclusive.

Figure 16:
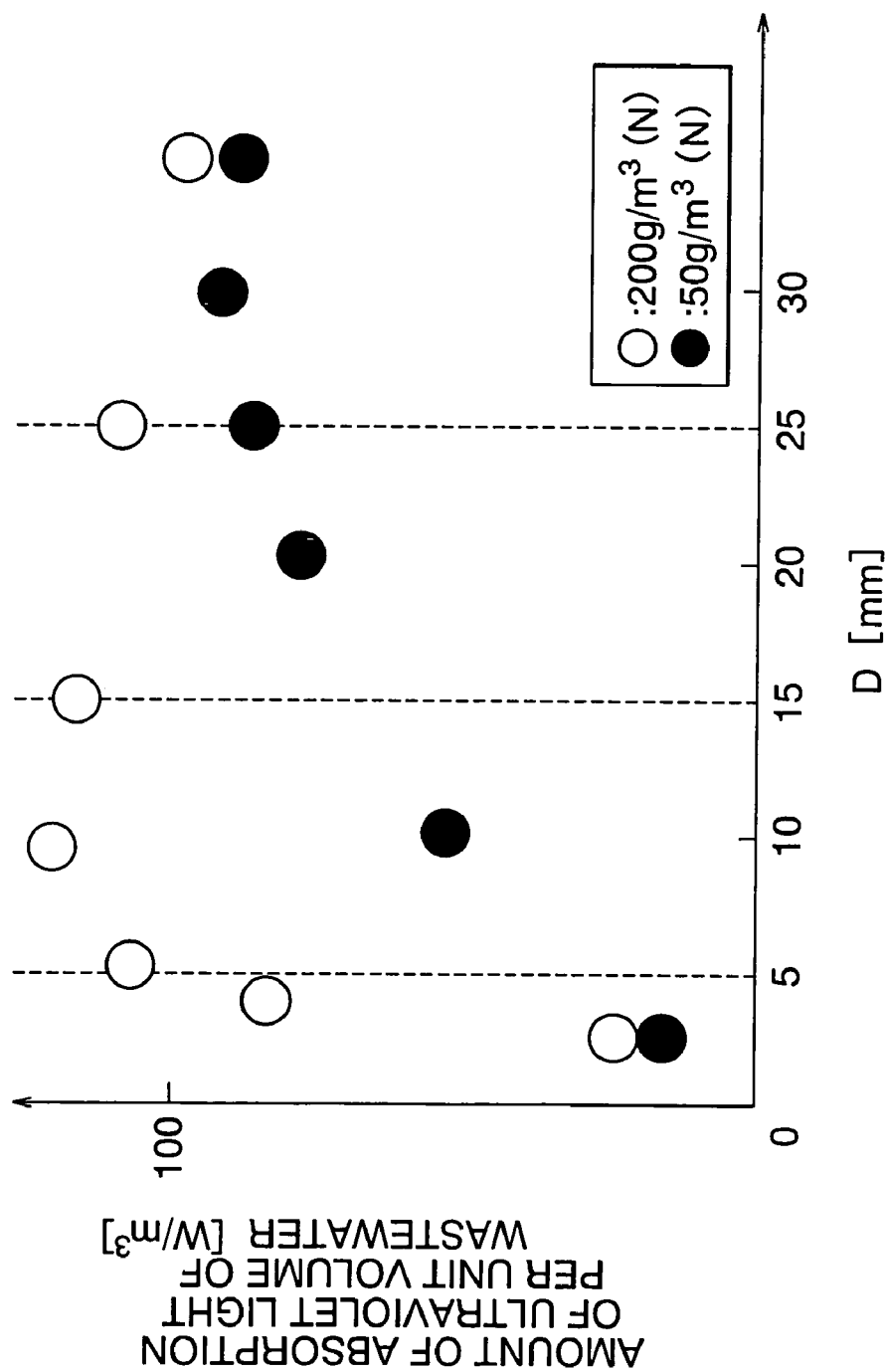
FIG. 16 is a characteristic view illustrating the effect of a water treatment apparatus according to a tenth embodiment of the present invention.

FIG. 16 illustrates the results of experiments in which the relation between a distance D from the inner wall surface $1a$ of the piping type reactor 1 to the ultraviolet radiation surface $3a$ of the ultraviolet radiation unit 10 and the ultraviolet dose (i.e., the amount of absorption of ultraviolet light) per unit volume of the wastewater was examined in the water treatment apparatus 101 according to the first embodiment shown in FIG. 1, on the conditions that the TOC concentration of the wastewater was 10 mg/L; G/L (i.e., the ratio between the flow rate of the ozone gas and the flow rate of the wastewater) was 0.5; the concentration of the ozone gas was 200 g/m$^3$(N) or 50 g/m$^3$(N); and the output power of the ultraviolet lamp was 110 W. As shown in FIG. 16, in the case of the ozone gas concentration being 200 g/m$^3$(N), the amount of absorption of ultraviolet light per unit volume of the wastewater became a maximum when the distance D was 10 mm, whereas in the case of the ozone gas concentration being 50 g/m$^3$(N), the amount of ultraviolet absorption became a maximum when the distance D was 30 mm. The reason why the amount of absorption of ultraviolet light per unit volume of the wastewater becomes a maximum at a certain piping diameter or distance D, and the reason why the higher the ozone gas concentration, the smaller becomes the piping diameter or distance D at which the amount of absorption of ultraviolet light per unit volume of the wastewater becomes a maximum, are the same as previously described in the ninth embodiment.

From the above result, it has been found that when the ozone gas has a high concentration of about 200 g/m$^3$(N), the distance from the inner wall surface $1a$ of the piping type reactor 1 to the ultraviolet radiation surface $3a$ of the ultraviolet radiation unit 10 as shown in FIG. 1 must be set to be between 5 mm and 25 mm, inclusive, preferably between 5 mm and 15 mm, inclusive.

As described above, in this tenth embodiment, the distance between the inner wall surface $1a$ of the piping type reactor 1 of the water treatment apparatus 101 and the ultraviolet radiation surface $3a$ of the ultraviolet radiation unit 10 as shown in FIG. 1 was set to be between 5 mm and 25 mm, inclusive, preferably between 5 mm and 15 mm, inclusive. Consequently, there is obtained an effect that the irradiated ultraviolet light can be effectively utilized, thereby enhancing the decomposition rate of the organic substances to be treated.

Embodiment 11

A water treatment apparatus according to an eleventh embodiment of the present invention is substantially the same in construction as that of the first embodiment, but in this eleventh embodiment, a wastewater passage in the form of the piping type reactor 1 as shown in FIG. 1 has a hydraulic diameter of between 10 mm and 50 mm, inclusive, preferably between 10 mm and 30 mm, inclusive.

Figure 17:
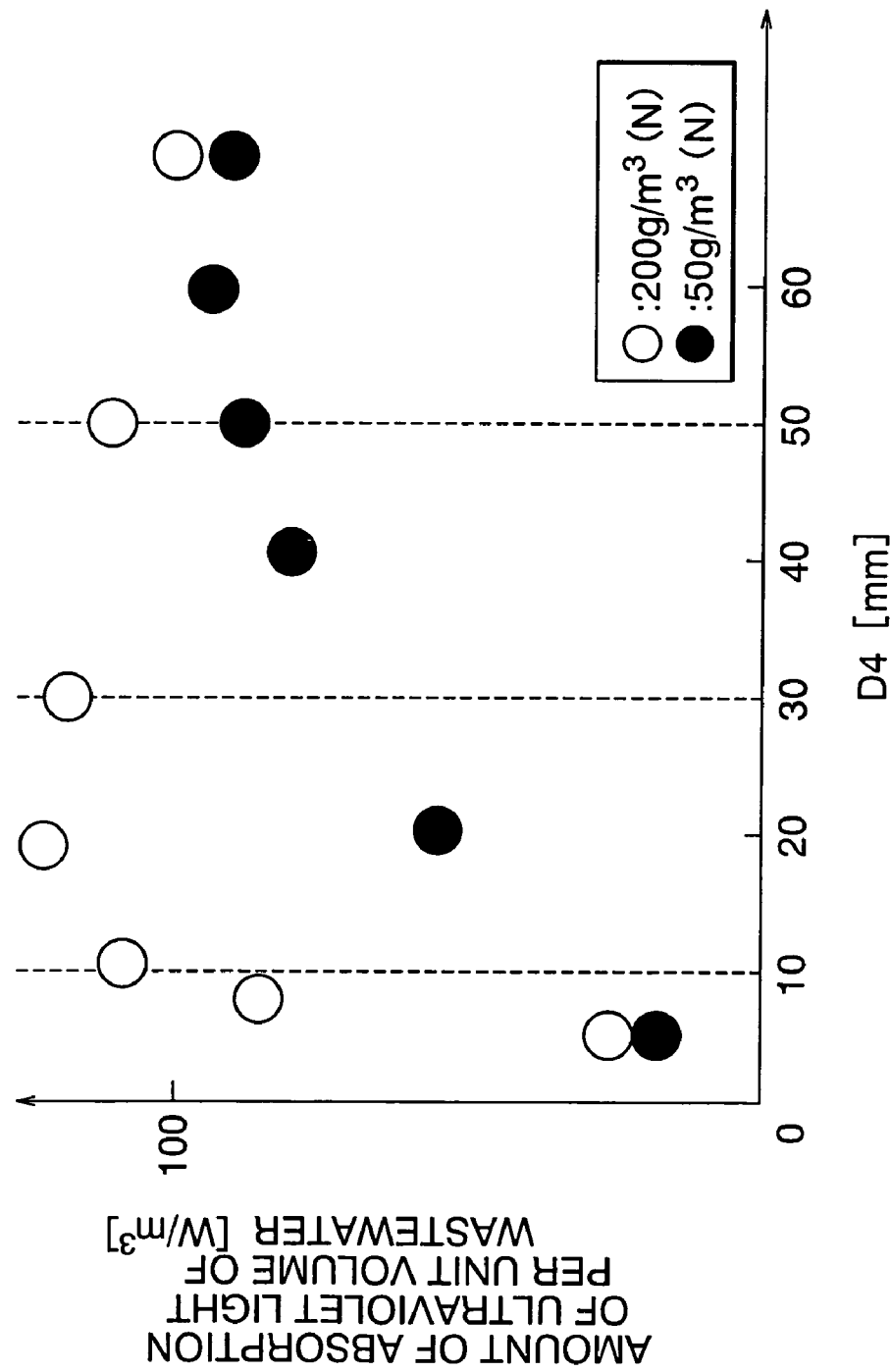
FIG. 17 is a characteristic view explaining the effect of a water treatment apparatus according to an eleventh embodiment of the present invention.

FIG. 17 illustrates the results of experiments in which the relation between the hydraulic diameter D4 of the piping type reactor 1 and the ultraviolet dose (i.e., the amount of absorption of ultraviolet light) per unit volume of the wastewater was examined in the water treatment apparatus 101 according to the first embodiment shown in FIG. 1, on the conditions that the TOC concentration of the wastewater was 10 mg/L; G/L (i.e., the ratio between the flow rate of the ozone gas and the flow rate of the wastewater) was 0.5; the concentration of the ozone gas was 200 g/M$^3$(N) or 50 g/m$^3$(N); and the output power of the ultraviolet lamp was 110 W. As shown in FIG. 17, in the case of the ozone gas concentration being 200 g/m$^3$(N), the amount of absorption of ultraviolet light per unit volume of the wastewater became a maximum when the hydraulic diameter D4 was 20 mm, whereas in the case of the ozone gas concentration being 50 g/m$^3$(N), the amount of ultraviolet absorption became a maximum when the hydraulic diameter D4 was 60 mm. The reason why the amount of absorption of ultraviolet light per unit volume of the wastewater becomes a maximum at a certain piping diameter or hydraulic diameter of the piping type reactor, and the reason why the higher the ozone gas concentration, the smaller becomes the piping diameter or hydraulic diameter of the piping type reactor at which the amount of absorption of ultraviolet light per unit volume of the wastewater becomes a maximum, are the same as previously described in the ninth embodiment.

From the above result, it has been found that when the ozone gas has a high concentration of about 200 g/m$^3$(N), the hydraulic diameter of the piping type reactor in the first embodiment as shown in FIG. 1 must be between 10 mm and 50 mm, inclusive, preferably between 10 mm and 30 mm, inclusive.

As described above, in this eleventh embodiment, the hydraulic diameter of the piping type reactor in the first embodiment as shown in FIG. 1 was set to be between 10 mm and 50 mm, inclusive, preferably between 10 mm and 30 mm, inclusive. Consequently, there is obtained an effect that the irradiated ultraviolet light can be effectively utilized, thereby enhancing the decomposition rate of the organic substances to be treated.

Embodiment 12

A water treatment apparatus according to a twelfth embodiment of the present invention is substantially the same in construction as that of the first embodiment, but in this twelfth embodiment, the product of a distance D[m] from the inner wall surface $1a$ of the piping type reactor 1 to the surface of the lamp jacket 3 as shown in FIG. 1 and formula 1 ($[1000e^{\{2.3(290h[O3G]+320[O3L]+1.86[H2O2])\}/100}/\{2.3(290h[O^3G]+320[O_3L]+1.86[H_2O_2])\}]^{1.5}$ (wherein h represents a gas holdup; [O$_3$G] a gaseous phase ozone concentration g/m$^3$(N); [O$_3$L] a liquid phase ozone concentration mg/L(N); and [H$_2$O$_2$] a hydrogen peroxide concentration mg/L(N).) was set to be between 0.01 and 0.1, inclusive, preferably between 0.03 and 0.07, inclusive.

Figure 18:
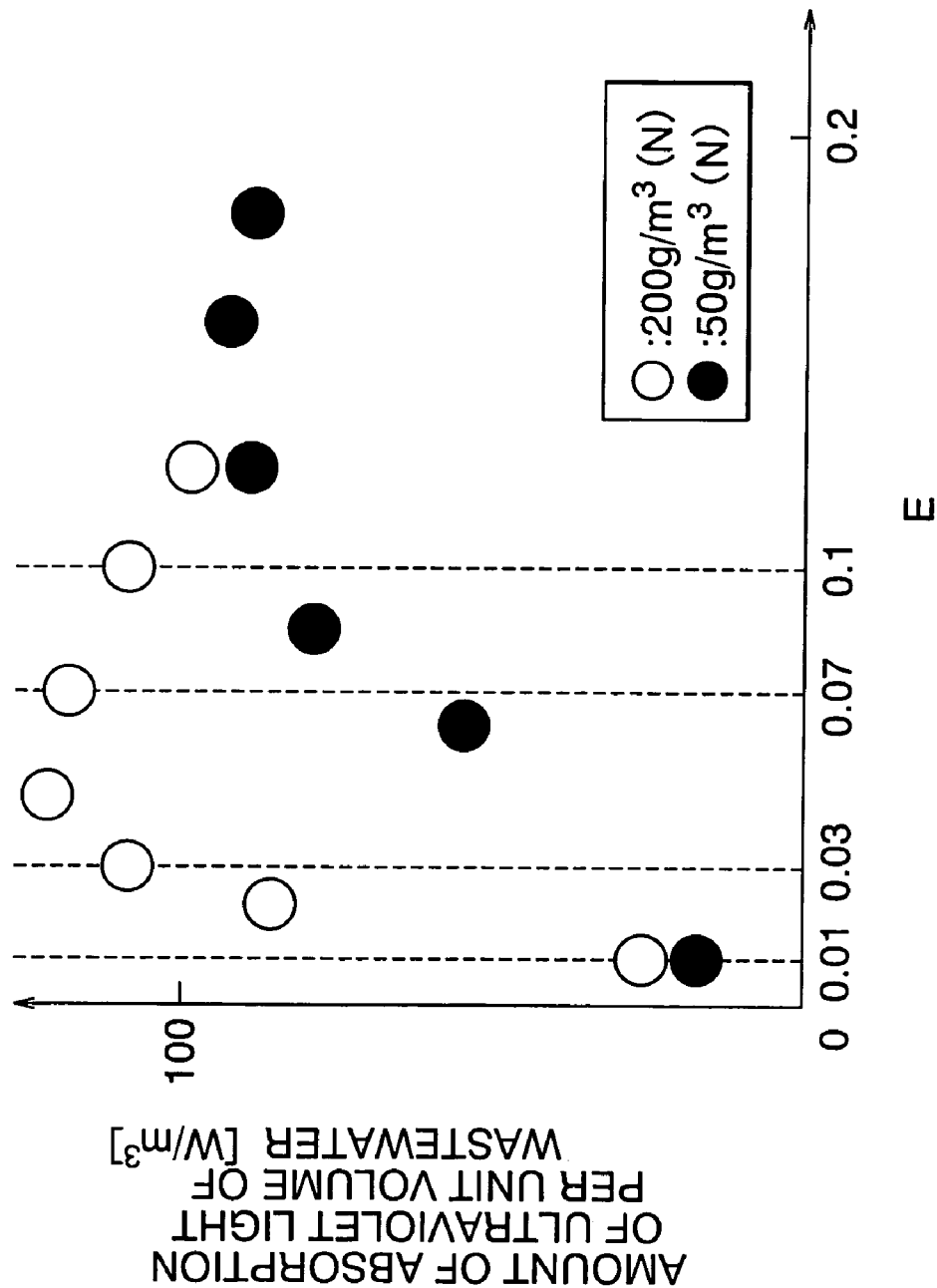
FIG. 18 is a characteristic view illustrating the effect of a water treatment apparatus according to a twelfth embodiment of the present invention.

FIG. 18 illustrates the results of experiments in which the relation between the amount of absorption of ultraviolet light per unit volume of the wastewater and the formula 1 was examined in the water treatment apparatus 101 in the first embodiment as shown in FIG. 1, the formula 1 being $(E=[1000e^{\{2.3(290h[O_3G]+320[O_3L]+1.86[H_2O_2])\}/100}/\{2.3(290h[O_3G]+320[O_3L]+1.86[H_2O_2])\}^{1.5})$ (wherein h represents a gas holdup; $[O_3G]$ a gaseous phase ozone concentration g/m$^3$(N); $[O_3L]$ a liquid phase ozone concentration mg/L (N); and $[H_2O_2]$ a hydrogen peroxide concentration mg/L (N).), which is an index uniquely devised by the present inventors for the purpose of making it possible to arrange and organize the concentration(s) of ozone and/or hydrogen peroxide absorbing ultraviolet light and the mixing rate or degree of the gas and liquid in the wastewater, in combination with each other. Here, note that the experiments were carried out on the conditions that the TOC concentration of the wastewater was 10 mg/L; G/L (i.e., the ratio between the flow rate of the ozone gas and the flow rate of the wastewater) was 0.5; the ozone gas concentration was 200 g/m$^3$ (N) or 50 g/m$^3$(N): and the output power of the ultraviolet lamp was 110 W. As shown in FIG. 18, in the case of the ozone gas concentration being 200 g/m$^3$(N), the amount of absorption of ultraviolet light per unit volume of the wastewater became a maximum when the index E was 0.05, whereas in the case of the ozone gas concentration being 50 g/m$^3$(N), the amount of ultraviolet absorption became a maximum when the index E was 0.25. From the above result, it has been found that when the ozone gas has a high concentration of about 200 g/m$^3$(N), the index E must be between 0.01 and 0.1, inclusive, preferably between 0.03 and 0.07, inclusive.

As described above, in this twelfth embodiment, the product of the distance D[m] from the inner wall surface 1a of the piping type reactor 1 to the surface of the lamp jacket 3 in the first embodiment as shown in FIG. 1 and the formula 1 $([1000e^{\{2.3(290h[O_3G]+320[O_3L]+1.86[H_2O_2])\}/100}/\{2.3(290h[O_3G]+320[O_3L]+1.86[H_2O_2])\}^{1.5}$ (wherein h represents a gas holdup; $[O_3G]$ a gaseous phase ozone concentration g/m$^3$(N); $[O_3L]$ a liquid phase ozone concentration mg/L (N); and $[H_2O_2]$ a hydrogen peroxide concentration mg/L (N).) was set to be between 0.01 and 0.1, inclusive, preferably between 0.03 and 0.07, inclusive. Consequently, there is obtained an effect that the irradiated ultraviolet light can be effectively utilized, thereby enhancing the decomposition rate of the organic substances to be treated.

Embodiment 13

A water treatment apparatus according to a thirteenth embodiment of the present invention is substantially the same in construction as that of the first embodiment, but in this thirteenth embodiment, the concentration of the ozone gas supplied by the ozone generator 40 shown in FIG. 1 was set to be 100 g/m$^3$(N) or more, preferably 150 g/m$^3$(N) or more.

Figure 19:
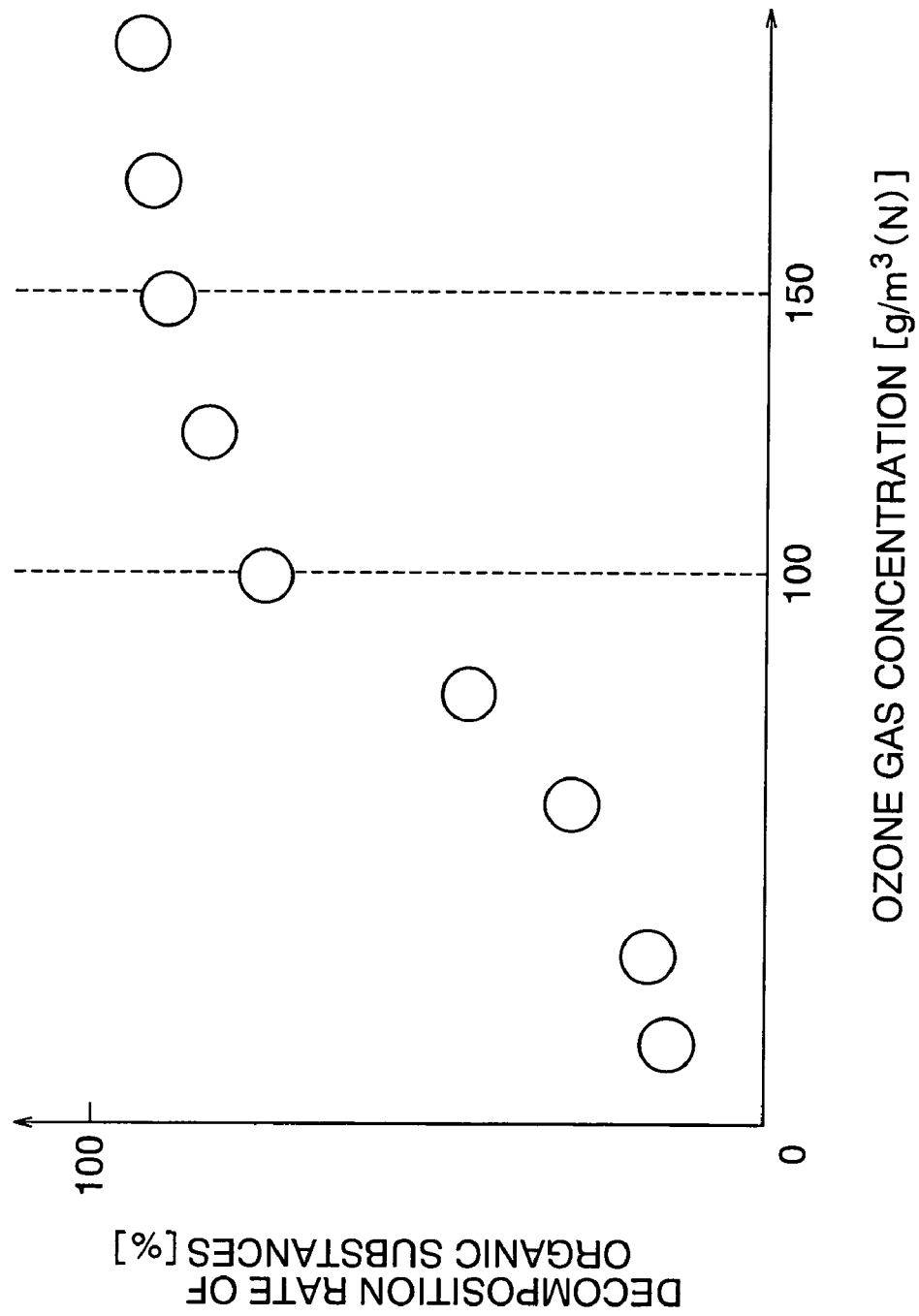
FIG. 19 is a characteristic view illustrating the effect of a water treatment apparatus according to a thirteenth embodiment of the present invention.

FIG. 19 illustrates the results of experiments in which the relation between the ozone gas concentration and the decomposition rate of organic substances was examined in the water treatment apparatus 101 according to the first embodiment shown in FIG. 1, on the conditions that the TOC concentration of the wastewater was 10 mg/L; G/L (i.e., the ratio between the flow rate of the ozone gas and the flow rate of the wastewater) was 0.5; and the output power of the ultraviolet lamp was 110 W. As shown in FIG. 19, the decomposition rate of organic substances increased in accordance with the increasing ozone gas concentration, and reached a decomposition rate of 80% at 100 g/m$^3$(N). From the experimental results shown in FIG. 19, it has been found that the ozone gas concentration as an operating condition of the apparatus according to the first embodiment shown in FIG. 1 must be set to be 100 g/m$^3$(N) or more, preferably 150 g/m$^3$(N) or more.

In addition, FIG. 20 illustrates the relation between the ozone gas concentration and the amount of ozone consumption ($\Delta O_3/\Delta TOC$) per unit organic substance removal amount calculated from the experimental results shown in FIG. 19. In FIG. 20, the axis of ordinate in this graph is standardized in such a manner that $\Delta O_3/\Delta TOC$ is equal to 1 when the ozone gas concentration is 100 g/m$^3$(N).

Thus, it has been found that the higher the ozone gas concentration, the smaller does $\Delta O_3/\Delta TOC$ become, thereby making it possible to perform the treatment efficiently. This is because the more the amount of ozone dissolved in the wastewater, the more does the reaction between hydrogen peroxide as a byproduct and ozone proceed, thus facilitating the generation of hydroxyl radicals that decompose the organic substances. On the contrary, the less the amount of ozone dissolved in the wastewater, the more dominant does only the reaction of generating hydrogen peroxide from the dissolved ozone become, and the generation of critical hydroxyl radicals does not proceed. This has not been known in the past, but could be first discovered by the present inventors who proved and focused attention on the accumulation of hydrogen peroxide due to the treatment. Furthermore, from the results shown in FIG. 20, it has been found that when the treatment is performed in the above-mentioned range of ozone concentration, i.e., 100 g/m$^3$(N) or more, preferably 150 g/m$^3$(N) or more, A $O_3/\Delta TOC$ becomes small and highly effective treatment can be carried out.

As stated above, in this thirteenth embodiment, the concentration of the ozone gas supplied by the ozone generator 40 in the water treatment apparatus 101 according to the first embodiment as shown in FIG. 1 was set to be 100 g/m$^3$(N) or more, preferably 150 g/m$^3$(N) or more, but 1,000 g/m$^3$(N) or less, as a consequence of which there is obtained an effect that the decomposition rate of the organic substances to be treated becomes high, and the amount of ozone consumption can be decreased, thus making it possible to perform a highly effective treatment.

In addition, as described above, according the present invention, an oxidizer mixing means for mixing an oxidizer with wastewater is arranged at an upstream side of a pipe through which the wastewater passes, and an ultraviolet radiation unit for irradiating ultraviolet light onto the wastewater is arranged at a downstream side of the oxidizer mixing means. With such an arrangement, there is obtained an effect that highly oxidizing hydroxyl radicals are generated by the reaction of the ozone dissolved in the wastewater and the ultraviolet light, thereby making it possible to decompose the substances to be treated.

Moreover, according to the present invention. a water treatment apparatus can be constructed such that an ozone gas is strongly sucked or drawn, for mixing, from a squeeze portion of a piping type reactor. With such a construction, the diameters of ozone gas bubbles can be made smaller as compared with known apparatuses in which an ozone gas is caused to be absorbed into the wastewater by the use of a diffuser, whereby a gas-liquid interfacial area is increased, thus making it possible to facilitate the dissolution of ozone into the liquid phase. That is, facilitating the generation of hydroxyl radicals provides an advantageous effect of being able to decompose the substances to be treated at a high speed and at a high efficiency.

Further, according to the present invention, a passage arranged in a piping type reactor at a downstream side of a squeeze portion is smooth without accompanying any sudden enlargement or expansion, so that an increase in diameter of gas bubbles due to the coalescence or combination thereof can be continuously kept, the diameters or sizes of gas bubbles in a small state. As a result, the gas-liquid interfacial area is increased, thus making it possible to facilitate the ozone dissolution into a liquid phase. That is, facilitating the generation of hydroxyl radicals provides an advantageous effect of being able to decompose the substances to be treated at a high speed and at a high efficiency.

What is claimed is:

1. A water treatment apparatus comprising:
an ultraviolet radiation unit radiating ultraviolet light;
an ultraviolet radiation part having an elongated tubular configuration, an internal surface, and receiving therein said ultraviolet radiation unit, said ultraviolet radiation unit being spaced from said internal surface of said ultraviolet radiation part for passage of wastewater between said ultraviolet radiation part and the internal surface; and
an oxidizer mixing part that is disposed adjacent to, in fluid communication with, and upstream of said ultraviolet radiation part, wherein said oxidizer mixing part includes
a minimum cross-sectional area part having an oxidizer suction port for drawing an oxidizer supplied from an oxidizer supply part into wastewater flowing in said oxidizer mixing part and past said oxidizer suction port, wherein the minimum cross-sectional area part is constricted to a first cross-sectional area, and
a conical part having a tapered configuration that expands from said minimum cross-sectional area part to a large passage part having a cross-sectional area substantially the same as the cross-sectional area of said ultraviolet radiation part, wherein said ultraviolet radiation part has a diameter so that the ultraviolet light radiated by said ultraviolet radiation unit has an intensity at said internal surface that is at least 30 W/m$^2$.

2. The water treatment apparatus according to claim 1, wherein distance from said minimum cross-sectional area part to said ultraviolet radiation part is no more than 50 cm.

3. The water treatment apparatus according to claim 1, wherein distance from said minimum cross-sectional area part to a range in which the ultraviolet light radiated by said ultraviolet radiation unit has an intensity of at least 100 W/m$^2$ is no more than 50 cm.

4. The water treatment apparatus according to claim 1, further comprising a flow passage for drawing treated water that has passed said ultraviolet radiation part and returning the treated water to a location upstream of said minimum cross-sectional area part.

5. A water treatment apparatus comprising:
an ultraviolet radiation unit radiating ultraviolet light;
an ultraviolet radiation part having an elongated tubular configuration, an internal surface, and receiving therein said ultraviolet radiation unit, said ultraviolet radiation unit being spaced from said internal surface of said ultraviolet radiation part for passage of wastewater between said ultraviolet radiation part and the internal surface; and
an oxidizer mixing part that is disposed adjacent to, in fluid communication with, and upstream of said ultraviolet radiation part, wherein said oxidizer mixing part includes
a minimum cross-sectional area part having an oxidizer suction port for drawing an oxidizer supplied from an oxidizer supply part into wastewater flowing in said oxidizer mixing part and past said oxidizer suction port, wherein the minimum cross-sectional area part is constricted to a first cross-sectional area, and
a conical part having a tapered configuration that expands from said minimum cross-sectional area part to a large passage part having a cross-sectional area substantially the same as the cross-sectional area of said ultraviolet radiation part, wherein said ultraviolet radiation part has a diameter so that the ultraviolet light has an intensity at said internal surface that is at least 10% stronger than intensity of the ultraviolet light at an ultraviolet radiation surface of said ultraviolet radiation unit.

6. The water treatment apparatus according to claim 1, wherein said oxidizer is selected from the group consisting of ozone, an ozone containing gas, and ozone dissolved in a liquid.

7. A water treatment apparatus comprising:
an ultraviolet radiation unit radiating ultraviolet light;
an ultraviolet radiation part having an elongated tubular configuration, an internal surface, and receiving therein said ultraviolet radiation unit, said ultraviolet radiation unit being spaced from said internal surface of said ultraviolet radiation part for passage of wastewater between said ultraviolet radiation part and the internal surface; and
an oxidizer mixing part that is disposed adjacent to, in fluid communication with, and upstream of said ultraviolet radiation part, wherein said oxidizer mixing part includes
a minimum cross-sectional area part having an oxidizer suction port for drawing an oxidizer supplied from an oxidizer supply part into wastewater flowing in said oxidizer mixing part and past said oxidizer suction port, wherein the minimum cross-sectional area part is constricted to a first cross-sectional area, and
a conical part having a tapered configuration that expands from said minimum cross-sectional area part to a large passage part having a cross-sectional area substantially the same as the cross-sectional area of said ultraviolet radiation part, wherein
the oxidizer is selected from the group consisting of ozone, an ozone-containing gas, and ozone dissolved in a liquid, and
the product of a distance D from said internal surface to an ultraviolet radiation surface of said ultraviolet radiation unit and $[1000e^{\{2.3(290h[O_3G]+320[O_3L]+1.86[H_2O_2])\}/100}/\{2.3(290h[O^3G]+320[O_3L]+1.86[H_2O_2])\}^{1.5}]$ (where h: a gas holdup, $\{O_3G\}$: gaseous phase ozone concentration, $\{O_3L\}$: liquid phase ozone concentration, and $[H_2O_2]$: hydrogen peroxide concentration) is in a range from 0.01 to 0.1.

8. A water treatment apparatus comprising:
an ultraviolet radiation unit radiating ultraviolet light;
an ultraviolet radiation part having an elongated tubular configuration, an internal surface, and receiving therein said ultraviolet radiation unit, said ultraviolet radiation unit being spaced from said internal surface of said ultraviolet radiation part for passage of wastewater between said ultraviolet radiation part and the internal surface; and an oxidizer mixing part that is disposed adjacent to, in fluid communication with, and upstream of said ultraviolet radiation part, wherein said oxidizer mixing part includes
- a minimum cross-sectional area part having an oxidizer suction port for drawing an oxidizer supplied from an oxidizer supply part into wastewater flowing in said oxidizer mixing part and past said oxidizer suction port, wherein the minimum cross-sectional area part is constricted to a first cross-sectional area, and
- a conical part having a tapered configuration that expands from said minimum cross-sectional area part to a large passage part having a cross-sectional area substantially the same as the cross-sectional area of said ultraviolet radiation part, wherein the oxidizer is an ozone-containing gas and the concentration of the ozone in the ozone-containing gas is in a range from 100 to 1,000 $g/m^3(N)$.

9. The water treatment apparatus according to claim 5, wherein distance from said minimum cross-sectional area part to said ultraviolet radiation part is no more than 50 cm.

10. The water treatment apparatus according to claim 5, wherein distance from said minimum cross-sectional area part to a range in which the ultraviolet light radiated by said ultraviolet radiation unit has an intensity of at least 100 $W/m^2$ is no more than 50 cm.

11. The water treatment apparatus according to claim 5, further comprising a flow passage for drawing treated water that has passed said ultraviolet radiation part and returning the treated water to a location upstream of said minimum cross-sectional area part.

12. The water treatment apparatus according to claim 5, wherein said oxidizer is selected from the group consisting of ozone, an ozone containing gas, and ozone dissolved in a liquid.

* * * * *